United States Patent
Xi et al.

(10) Patent No.: US 10,746,274 B2
(45) Date of Patent: Aug. 18, 2020

(54) MOTOR AND CAMSHAFT THEREOF, AND MANUFACTURING METHOD FOR CAMSHAFT

(71) Applicant: SHANGHAI UNIVERSOON AUTOPARTS CO., LTD., Shanghai (CN)

(72) Inventors: Yong Xi, Shanghai (CN); Zhou Yang, Shanghai (CN); Song Zhu, Shanghai (CN); Fengwu Zhang, Shanghai (CN)

(73) Assignee: Shanghai Universoon Autoparts Co., Ltd., Shanghai (CN)

( * ) Notice: Subject to any disclaimer, the term of this patent is extended or adjusted under 35 U.S.C. 154(b) by 18 days.

(21) Appl. No.: 16/315,900

(22) PCT Filed: Jul. 4, 2017

(86) PCT No.: PCT/CN2017/091722
§ 371 (c)(1),
(2) Date: Jan. 7, 2019

(87) PCT Pub. No.: WO2018/006803
PCT Pub. Date: Jan. 11, 2018

(65) Prior Publication Data
US 2019/0226569 A1    Jul. 25, 2019

(30) Foreign Application Priority Data

Jul. 8, 2016   (CN) ............ 2016 1 0537009
Oct. 14, 2016  (CN) ............ 2016 1 0899486
May 26, 2017   (CN) ............ 2017 1 0387766

(51) Int. Cl.
*F16H 53/02*     (2006.01)
*F01L 1/047*     (2006.01)
(Continued)

(52) U.S. Cl.
CPC ............. *F16H 53/025* (2013.01); *B21C 1/22* (2013.01); *B21K 1/06* (2013.01); *F01L 1/047* (2013.01);
(Continued)

(58) Field of Classification Search
CPC .............. F01L 1/047; F01L 2001/0473; F01L 2103/00; F16H 53/025; B21C 1/22; B21K 1/06
See application file for complete search history.

(56) References Cited

U.S. PATENT DOCUMENTS

| | | | |
|---|---|---|---|
| 4,293,995 A | 10/1981 | Jordan | |
| 4,575,913 A | 3/1986 | Sugiuchi et al. | |
| 2016/0130990 A1* | 5/2016 | Schutzle | F01L 13/0036 123/90.18 |

FOREIGN PATENT DOCUMENTS

| CN | 2422449 Y | 7/2001 |
|---|---|---|
| CN | 1469031 A | 1/2004 |

(Continued)

OTHER PUBLICATIONS

International Search Report for PCT/CN2017/091722, dated Oct. 10, 2017.
Chinese Examination Report, dated Oct. 10, 2017.

*Primary Examiner* — David H Bollinger
(74) *Attorney, Agent, or Firm* — Zhu Lupkowski LLP

(57) ABSTRACT

Engine and its camshaft, camshaft manufacturing method, the camshaft comprises a central shaft having an axial hole, the central shaft has a fitting section, the outer circumference of a cross section at any axial position of the fitting section is a polygon; a first cam and a second cam, the first cam and second cam are respectively installed on the fitting section of the central shaft and are spaced axially. Such a structure has the advantages of higher torque transmission, simpler struc- (Continued)

ture, simplified manufacturing process, shorter manufacturing time consumption and reduced cost.

17 Claims, 8 Drawing Sheets

(51) Int. Cl.
*B21C 1/22* (2006.01)
*B21K 1/06* (2006.01)

(52) U.S. Cl.
CPC .................. *F01L 2001/0473* (2013.01); *F01L 2001/0475* (2013.01); *F01L 2103/00* (2013.01)

(56) References Cited

FOREIGN PATENT DOCUMENTS

| CN | 205330751 U | 6/2016 |
| CN | 105804822 A | 7/2016 |
| CN | 205445706 U | 10/2016 |

* cited by examiner

MOTOR AND CAMSHAFT THEREOF, AND MANUFACTURING METHOD FOR CAMSHAFT

This application claims priority to Chinese Patent Application No. 201610537009.5, entitled "Engine, camshaft thereof, camshaft manufacturing method" filed on Jun. 8, 2016; Chinese Patent Application No. 201610899486.6, entitled" Camshaft and camshaft tube and cam manufacturing method" filed on Oct. 14, 2016; and Chinese Patent Application No. 201710387766.3, entitled "Camshaft and Camshaft Manufacturing Method" filed on May 26, 2017, all of which are incorporated herein by reference.

TECHNICAL FIELD

The present invention relates to the automobile engine field, and more particularly to an engine and engine camshaft, camshaft manufacturing method.

BACKGROUND

The valve mechanism of an engine is responsible for providing fresh air for the engine cylinders, which is required for gasoline combustion and doing work, and for exhaust emission.

Camshafts are critical components of the valve mechanism. An engine is equipped with an admission camshaft and an emission camshaft, and each camshaft has a central shaft as well as a cam arranged round the central shaft. The central shaft is connected with the engine crankshaft via a drive chain or belt, and it rotates in synchronization with the cam. The cam of the admission camshaft is used to drive the admission valve of the engine for opening/closing while that of the emission camshaft is used to drive the emission valve of the engine for opening/closing.

In prior engines, the cam of an assembled camshaft is coupled with the central shaft by splines. Although splined coupling may ensure a precise cam angle position, it still has the following demerits:

Firstly, in order to form splines on the inner circumferential surface of the cam and the outer circumferential surface of the central shaft, the structure of the parts is made complicated. In addition, a special-purposed machine must be used to form the splines, and the parts are subject to carburization treatment to ensure a good part performance, resulting in complicated manufacturing process, long time consumption and high cost.

Secondly, the cam requires big axial dimensions, which is usually formed by means of casting process at a higher cost.

Thirdly, torque that can be transmitted by the splines is limited.

Besides the above, methods currently used to manufacture camshafts include: traditional one-piece casting method, forging method as well as assembled camshaft manufacturing method. Camshaft manufactured by casting method and forging method has a plural of demerits, for example, performance maximization design and utilization are impossible in various positions of the camshaft. This is because the performance requirements on the various parts including cam, journal, central shaft and drive unit, etc. are quite different from each other. If only a single type of material is used, it is impossible to maximize the performance of each part, and the whole manufacturing process is complicated and requires a great number of machining procedures, resulting in a low productivity, high energy consumption and severe environmental pollution.

Manufacturing methods for combined camshaft include: welding method, pipe expansion method and mechanical knurling method, etc. All these methods mostly involve decomposing the camshaft into individual cam part, intermediate central shaft part, drive part, etc., and then connecting the various parts to form a complete camshaft by using different manufacturing processes and methods. Of these methods, the mechanical knurling method can be used to connect the cam and the central shaft by making splines. Although the splined connection can ensure a precise cam angle position, it still has the following demerits: firstly, in order to form splines on the inner circumferential surface of the cam and the outer circumferential surface of the central shaft, the structure of the parts is made complicated. In addition, a special-purposed machine must be used to form the splines, and the parts are subject to carburization treatment to ensure a good part performance, resulting in complicated manufacturing process, long time consumption and high cost. Secondly, for the splined connection between the cam and the central shaft, only one cam can be connected on the central shaft at a time, and the assembly of one camshaft can only be completed by multiple sub-assemblies.

SUMMARY OF THE INVENTION

It is therefore an objection of the present invention to solve the problems of the prior camshaft including complicated structure, complicated manufacturing process, long time consumption, high cost and limited transmission torque.

To solve the aforesaid problems, the present invention provides a camshaft, comprising: central shaft with axial hole, the central shaft has a fitting section, the outer circumference of a cross section at any axial position of the fitting section is a polygon; a first cam and a second cam, the first cam and second cam are respectively installed on the fitting section of the central shaft and are spaced axially, cross sections of the inner circumferential surfaces of the first cam and second cam are all polygons, the fitting section at least extends axially from the first cam to the second cam.

Optionally, circular arc transition is provided between any two neighboring sides of the polygons.

Optionally, at least one of the first cam and second cam includes an axially spaced first part and second part; the first part and second part are respectively installed on the central shaft, and are fixed to the central shaft axially, radially and circumferentially; the first part has a first axial end face, the second part has a second axial end face, the first axial end face and the second axial end face are arranged face to face and separated from each other.

Optionally, at least one of the first cam and second cam includes an axially spaced first part and second part; the first part and second part are respectively installed on the central shaft, and are fixed to the central shaft axially, radially and circumferentially; the first part has a first axial end face, the second part has a second axial end face, the first axial end face and the second axial end face are arranged face to face and in contact with each other.

Optionally, at least one of the first cam and second cam includes an axially spaced first part and second part; except for axial thickness, the first part and second part are identical in shape.

Optionally, at least one of the first cam and second cam includes an axially spaced first part and second part; the first part and second part are totally identical in shape.

Optionally, in the direction towards the second part axially, dimensions of the cross section of the inner circumferential surface of the first part tend to decrease.

Optionally, in the direction towards the first part axially, dimensions of the cross section of the inner circumferential surface of the second part tend to decrease.

Optionally, the slant angle of the inner circumferential surface of the first part relative to the central axis is greater than the self-lock angle between the first part and the central shaft, the slant angle of the inner circumferential surface of the second part relative to the central axis is greater than the self-lock angle between the second part and the central shaft.

Optionally, the slant angle of the inner circumferential surfaces of the first part and second part relative to the central axis is greater than arctan 0.1.

The present invention also provides an engine comprising a first air valve; a second air valve; camshaft of any of the aforesaid, the first cam is used to drive the first air valve but does not drive the second air valve, the second cam is used to drive the second air valve but does not drive the first air valve.

The present invention further provides a camshaft, comprising: a central shaft; a cam that is installed on the central shaft, the cam includes an axially spaced first part and second part, the first part and second part are respectively installed on the central shaft, and are all axially, radially and circumferentially fixed on the central shaft; the first part has a first axial end face, the second part has a second axial end face, the first axial end face and the second axial end face are arranged face to face.

Optionally, the first part has a cam profile used for engine braking, the second part has a cam profile used for normal operation of the engine.

Optionally, except for axial thickness, the first part and second part are identical in shape.

Optionally, the first part and second part are totally identical in shape.

Optionally, in the direction towards the second part axially, dimensions of the cross section of the inner circumferential surface of the first part tend to decrease.

Optionally, in the direction towards the first part axially, dimensions of the cross section of the inner circumferential surface of the second part tend to decrease.

Optionally, the slant angle of the inner circumferential surface of the first part relative to the central axis is greater than the self-lock angle between the first part and the central shaft, the slant angle of the inner circumferential surface of the second part relative to the central axis is greater than the self-lock angle between the second part and the central shaft.

Optionally, the slant angle of the inner circumferential surfaces of the first part and second part relative to the central axis is greater than arctan 0.1.

The present invention further provides an engine comprising air valves; the camshaft mentioned in any of the above items, the first and second parts of the cam drive at least the same said air valve.

The present invention also provides a camshaft comprising a central shaft; cam installed on the central shaft, the cam includes an axially spaced first part and second part, the first part has a first axial end face, the second part has a second axial end face, the first axial end face and the second axial end face are arranged face to face; except for axial thickness, the first part and second part are identical in shape.

Optionally, the first part and second part are totally identical in shape.

Optionally, in the direction towards the second part axially, dimensions of the cross section of the inner circumferential surface of the first part tend to decrease.

Optionally, in the direction towards the first part axially, dimensions of the cross section of the inner circumferential surface of the second part tend to decrease.

Optionally, the slant angle of the inner circumferential surface of the first part relative to the central axis is greater than the self-lock angle between the first part and the central shaft, the slant angle of the inner circumferential surface of the second part relative to the central axis is greater than the self-lock angle between the second part and the central shaft.

Optionally, the slant angle of the inner circumferential surfaces of the first part and second part relative to the central axis is greater than arctan 0.1.

This invention also provides a camshaft manufacturing method, including: first installing the cam on the fitting section of the central shaft, the outer circumference of a cross section at any axial position of the fitting section is a polygon, cross section of the inner circumferential surface of the cam is a polygon, the central shaft has an axial hole, the hole extends to the fitting section; then expanding the part of the central shaft fitting section inserted into the cam, making the inserted part have its outer diameter increased and radially press tight against the cam.

Optionally, procedure to expand the inserted part of the fitting section in the cam includes: inserting the expansion part into the hole, making the inserted part to expand radially.

Optionally, radially at least in one direction, dimensions of the expansion part are greater than the dimensions of the hole.

Optionally, procedure to expand the inserted part of the fitting section in the cam includes: Introducing a fluid into the hole under pressure, making the inserted part to expand radially.

Optionally, an arc transition is provided in any of the two neighboring sides of the polygon.

Optionally, the cam includes an axially spaced first part and second part on the central shaft.

Optionally, except for axial thickness, the first part and second part are identical in shape.

Optionally, the first part and second part are totally identical in shape.

Optionally, axially in the direction towards the second part, dimensions of the cross section of the inner circumferential surface of the first part tend to decrease.

Optionally, in the direction towards the first part axially, dimensions of the cross section of the inner circumferential surface of the second part tend to decrease.

Optionally, the slant angle of the inner circumferential surface of the first part relative to the central axis is greater than the self-lock angle between the first part and the central shaft, the slant angle of the inner circumferential surface of the second part relative to the central axis is greater than the self-lock angle between the second part and the central shaft.

Optionally, the slant angle of the inner circumferential surfaces of the first part and second part relative to the central axis is greater than arctan 0.1.

Optionally, a cold stamping process is used to manufacture at least one of the first part and second part.

The present invention further provides a camshaft manufacturing method, including: installing the first part and second part of the cam respectively on the fitting section of the central shaft, the first part and second part are axially spaced, the central shaft has an axial hole, the hole extends to the fitting section; and then expanding the inserted part of the fitting section into the first part and second part, making the inserted part have its outer diameter increased and press tightly against the first part and second part radially.

Optionally, a procedure to expand the inserted part of the fitting section in the first part and second part includes: inserting the expansion part into the hole, making the inserted part to expand radially.

Optionally, radially at least in one direction, dimensions of the expansion part are greater than the dimensions of the hole.

Optionally, a procedure to expand the inserted part of the fitting section in the first part and second part includes: introducing a fluid into the hole under pressure, making the inserted part to expand radially.

Optionally, the first part includes a cam profile used for engine braking, the second part has a cam profile used for normal ignition of the engine.

Optionally, except for axial thickness, the first part and second part are identical in shape.

Optionally, the first part and second part are totally identical in shape.

Optionally, in the direction towards the second part axially, dimensions of the cross section of the inner circumferential surface of the first part tend to decrease.

Optionally, in the direction towards the first part axially, dimensions of the cross section of the inner circumferential surface of the second part tend to decrease.

Optionally, the slant angle of the inner circumferential surface of the first part relative to the central axis is greater than the self-lock angle between the first part and the central shaft, the slant angle of the inner circumferential surface of the second part relative to the central axis is greater than the self-lock angle between the second part and the central shaft.

Optionally, the slant angle of the inner circumferential surfaces of the first part and second part relative to the central axis is greater than arctan 0.1.

Optionally, cold stamping process is used to manufacture at least one of the first part and second part.

The present invention provides a camshaft comprising a central shaft with a fitting section, the outer circumferential surface of the fitting section has the same cross section profile at any axial position, the cross section profile includes: linear zone and circular zone, the circular zone belongs to the same circle and includes multiple arcs, the linear zone belongs to the same polygon and includes multiple straight lines, the straight line and the arc are spaced in an interweaved manner circumferentially, and interconnected into the cross section profile; cam installed on the fitting section of the central shaft.

Optionally, the circle and the polygon are concentric.

Optionally, it also includes a bearing, mounted on the fitting section of the central shaft, the bearing has an inner bore for fitting with the central shaft, the inner bore is round and the circle has a diameter identical to that of the circle to which the circular zone belongs.

Optionally, it also includes a bearing, the bearing has an inner bore, the inner bore includes a cambered surface for fitting with the circular zone of the central shaft.

Optionally, the profile and shape of the cross section of the inner circumferential surface of the cam is identical to that of the cross section of the outer circumferential surface of the fitting section.

Optionally, there are a plurality of the cams that are respectively installed on the fitting section of the central shaft and are axially spaced.

The present invention further provides a camshaft comprising central shaft; a cam, installed on the central shaft, cross section profile of the inner circumferential surface of the cam includes: linear zone and circular zone, the circular zone belongs to the same circle and includes multiple arcs, the linear zone belongs to the same polygon and includes multiple straight lines, the straight line and the arc are spaced in an interweaved manner circumferentially, and interconnected into the cross section profile Optionally, the circle and the polygon are concentric.

The present invention further provides a camshaft manufacturing method, including: a cold stamping process is used to manufacture at least one of the first part and second part of the cam; the first part and second part are respectively installed on the central shaft.

Optionally, it also includes: respectively fixing the first part and second part on the central shaft, and these are arranged in such a manner that they can be used to drive the same air valve.

Optionally, it also includes: expanding the inserted part of the central shaft into the first part and second part, making the outer diameter of the inserted part to increase and press tightly against the first part and second part radially.

Optionally, the central shaft has an axial hole, and procedure to expand the inserted part of the central shaft in the first part and second part includes: inserting the expansion part into the axial hole, making the inserted part expand radially.

Optionally, the central shaft has an axial hole, and procedure to expand the inserted part of the central shaft in the first part and second part includes: introducing a fluid into the axial hole under pressure, making the inserted part expand radially.

The present invention further provides a camshaft manufacturing method, including: forming a central shaft that has an axial hole; installing the cam on the central shaft; the central shaft forming procedure includes: forming a tube with outer cylindrical surface by cold drawing; forming a plural of circumferentially spaced planes on the outer cylindrical surface by cold drawing, the planes extend radially along the tube, making cross sectional profile of the outer circumferential surface of the tube include linear zone and circular zone, the circular zone belongs to the same circle and includes multiple arcs, the linear zone belongs to the same polygon and includes multiple straight lines, the straight line and the arc are spaced in an interweaved manner circumferentially, and interconnected into the cross section profile.

Optionally, the circle and the polygon are concentric.

Optionally, before installing the cam on the central shaft, it also includes: forming the first and second parts of the cam by cold stamping; cross sectional shape of the inner circumferential surface of the first part and second part is identical to the cross sectional shape of the outer circumferential surface of the central shaft; when installing the cam on the central shaft, respectively install the first part and second part on the central shaft, and make the outer circumferential surface of the central shaft match with the inner circumferential surfaces of the first part and second part.

Optionally, expand the inserted part of the central shaft in the cam, making the inserted part have its outer diameter increased and tightly press against the cam radially.

Optionally, a procedure to expand the inserted part of the central shaft in the cam includes: inserting the expansion part into the axial hole, making the inserted part to expand radially.

Optionally, a procedure to expand the inserted part of the central shaft in the cam includes: introducing a fluid into the axial hole under pressure, making the inserted part to expand radially.

This invention also provides a camshaft manufacturing method, including: manufacturing the first part and second part of the cam by cold clamping process, cross section of the inner circumferential surface of the first part and second part includes linear zone and circular zone, the circular zone belongs to the same circle and includes multiple arcs, the linear zone belongs to the same polygon and includes multiple straight lines, the straight line and the arc are spaced in an interweaved manner circumferentially, and interconnected into the cross sectional profile; installing the first part and second part of the cam respectively on the central shaft.

Optionally, it may include: the circle and the polygon are concentric.

Optionally, the crosssectional shape of the outer circumferential surface of the central shaft is identical to the crosssectional shape of the inner circumferential surface of the first part and second part; when installing the first part and second part on the central shaft, the outer circumferential surface of the central shaft matches the inner circumferential surface of the first part and second part.

Optionally, expand the inserted part of the central shaft in the first part and second part, making the inserted part have its outer diameter increased and tightly press against the first part and second part radially.

Optionally, the central shaft has an axial hole, and procedure to expand the inserted part of the central shaft in the first part and second part includes: inserting the expansion part into the axial hole, making the inserted part expand radially.

Optionally, the central shaft has an axial hole, and procedure to expand the inserted part of the central shaft in the first part and second part includes: introducing a fluid into the axial hole under pressure, making the inserted part expand radially.

The present invention also provides a tube manufacturing method, including:

forming a tube with outer cylindrical surface by cold drawing; forming a plural of circumferentially spaced planes on the outer cylindrical surface by cold drawing, the planes extend radially along the tube, making cross section profile of the outer circumferential surface of the tube include linear zone and circular zone, the circular zone belongs to the same circle and includes multiple arcs, the linear zone belongs to the same polygon and includes multiple straight lines, the straight line and the arc are spaced in an interweaved manner circumferentially, and interconnected into the cross section profile.

Optionally, the tube is the central shaft of the camshaft.

The present invention provides a cam manufacturing method, including: manufacturing the first part and second part of the cam by using cold stamping process, inner circumferential surface of the first part and second part includes a linear zone and a circular zone, the linear zone belongs to the same polygon and includes multiple straight lines, the straight line and the arc are spaced in an interweaved manner circumferentially, and interconnected into the cross section profile;

The present invention further provides a camshaft, including: central shaft with axial hole, the central shaft has a fitting section, the cross section of the outer circumferential surface of the fitting section is a polygon at any axial position; a first cam and a second cam, the first cam and second cam are respectively installed on the fitting section of the central shaft and are spaced axially, cross sections of the inner circumferential surfaces of the first cam and second cam are all polygons, the fitting section at least extends axially from the first cam to the second cam.

Optionally, the cross section of the outer circumferential surface of the central shaft fitting section and the cross section of the inner circumferential surface of the first cam and second cam are polygons having the same number of sides. In other words, cross section of the outer circumferential surface of the fitting section is identical to the cross section of the inner circumferential surface of the first cam and second cam in shape.

Optionally, when the polygon of the central shaft fitting section is concentric with the polygon of the inner circumferential surface of the first cam and second cam, the gap between the central shaft fitting section and the first cam and second cam is identical in dimensions at any circumferential position.

Optionally, a circular arc transition is provided between any two neighboring sides of the polygons. In other words, any two neighboring sides in the polygons are connected via arcs.

Optionally, a circle center of the transitional (or connecting) arc between any two neighboring sides in the polygon of the cam coincides with the center of the polygon of the cam.

Optionally, circle center of the transitional (or connecting) arc between any two neighboring sides in the polygon of the central shaft coincides with the center of the polygon of the central shaft.

Optionally, at least one of the first cam and second cam includes an axial spaced first part and second part:

The first part and second part are respectively installed on the central shaft and are all fixed to the central shaft axially, radially and circumferentially; the first part has a first axial end face, the second part has a second axial end face, the first axial end face and the second axial end face are arranged face to face and separated from each other.

Optionally, at least one of the first cam and second cam includes an axially spaced first part and second part; the first part and second part are respectively installed on the central shaft, and are all fixed to the central shaft axially, radially and circumferentially; the first part has a first axial end face, the second part has a second axial end face, the first axial end face and the second axial end face are arranged face to face and in contact with each other.

Optionally, at least one of the first cam and second cam includes an axially spaced first part and second part; except for axial thickness, the first part and second part are identical in shape.

Optionally, at least one of the first cam and second cam includes an axially spaced first part and second part; the first part and second part are totally identical in shape.

Optionally, in the direction towards the second part axially, dimensions of the cross section of the inner circumferential surface of the first part tend to decrease.

Optionally, in the direction towards the first part axially, dimensions of the cross section of the inner circumferential surface of the second part tend to decrease.

Optionally, the slant angle of the inner circumferential surface of the first part relative to the central axis is greater than the self-lock angle between the first part and the central shaft, the slant angle of the inner circumferential surface of the second part relative to the central axis is greater than the self-lock angle between the second part and the central shaft.

Optionally, the slant angle of the inner circumferential surfaces of the first part and second part relative to the central axis is greater than arctan 0.1.

Optionally, it further includes at least two bearings, the bearings are installed on the fitting section of the central shaft and axially spaced, cross section of the inner circumferential surface of the bearings installed on the central shaft is a polygon, outer circumferential surface of the bearing is a cylindrical surface.

The present invention also provides an engine, comprising a first air valve; a second air valve; the aforesaid camshaft having a first cam and second dam, the first cam is used for drive the first air valve, the second cam is used to drive the second air valve.

Optionally, the engine includes at least 3 cylinders, and the number of sides of the polygon in the camshaft is identical to the number of engine cylinders.

The present invention further provides a camshaft, comprising: a central shaft; a cam that is installed on the central shaft, the cam includes an axially spaced first part and second part, the first part and second part are respectively installed on the central shaft, and are all axially, radially and circumferentially fixed on the central shaft; the first part has a first axial end face, the second part has a second axial end face, the first axial end face and the second axial end face are arranged face to face.

Optionally, the first part has a cam profile used for engine braking, the second part has a cam profile used for normal operation of the engine.

Optionally, except for axial thickness, the first part and second part are identical in shape.

Optionally, the first part and second part are totally identical in shape.

Optionally, in the direction towards the second part axially, dimensions of the cross section of the inner circumferential surface of the first part tend to decrease.

Optionally, in the direction towards the first part axially, dimensions of the cross section of the inner circumferential surface of the second part tend to decrease.

Optionally, the slant angle of the inner circumferential surface of the first part relative to the central axis is greater than the self-lock angle between the first part and the central shaft, the slant angle of the inner circumferential surface of the second part relative to the central axis is greater than the self-lock angle between the second part and the central shaft.

Optionally, the slant angle of the inner circumferential surfaces of the first part and second part relative to the central axis is greater than arctan 0.1.

The present invention also provides a camshaft comprising a central shaft; a cam installed on the central shaft, the cam includes an axially spaced first part and second part, the first part has a first axial end face, the second part has a second axial end face, the first axial end face and the second axial end face are arranged face to face; except for axial thickness, the first part and second part are identical in shape.

Optionally, the first part and second part are totally identical in shape.

Optionally, in the direction towards the second part axially, dimensions of the cross section of the inner circumferential surface of the first part tend to decrease.

Optionally, in the direction towards the first part axially, dimensions of the cross section of the inner circumferential surface of the second part tend to decrease.

Optionally, the slant angle of the inner circumferential surface of the first part relative to the central axis is greater than the self-lock angle between the first part and the central shaft, the slant angle of the inner circumferential surface of the second part relative to the central axis is greater than the self-lock angle between the second part and the central shaft.

Optionally, the slant angle of the inner circumferential surfaces of the first part and second part relative to the central axis is greater than arctan 0.1.

This invention also provides a camshaft manufacturing method, including: first installing the cam on the fitting section of the central shaft, the outer circumference of a cross section at any axial position of the fitting section is a polygon, cross-section of the inner circumferential surface of the cam installed on the central shaft is a polygon, the central shaft has an axial hole, the hole extends to the fitting section; then expanding the part of the central shaft fitting section inserted into the cam, making the inserted part have its outer diameter increased and axially press tight against the cam.

Optionally, a procedure to expand the inserted part of the central shaft fitting section in the cam includes: inserting the expansion part into the axial hole, making the inserted part to expand radially.

Optionally, radially at least in one direction, dimensions of the expansion part are greater than the dimensions of the axial hole.

Optionally, a procedure to expand the inserted part of the central shaft fitting section in the cam includes: introducing a fluid into the axial hole under pressure, making the inserted part to expand radially.

Optionally, procedure to expand the inserted part of the central shaft fitting section in the cam includes: Making the axial hole in the central shaft into a blind hole, filling the blind hole up with a liquid, pressing an expansion part into the blind hole from the opening end of the blind hole, increasing the pressure of the fluid in the axial hole, making the inserted part to expand radially.

Optionally, the expansion part is a steel ball.

Optionally, the expansion part is two or more steel balls.

Optionally, the two or more steel balls are arranged in series axially, and spacers are provided between steel balls.

Optionally, the two or more steel balls have different diameters.

Optionally, arc transition (or connection) is provided between any two neighboring sides in the polygon.

Optionally, the circle center of the transitional (or connecting) arc between any two neighboring sides in the polygon coincides with the center of the polygon.

Optionally, the cam includes an axially spaced first part and second part of the central shaft.

Optionally, except for axial thickness, the first part and second part are identical in shape.

Optionally, the first part and second part are totally identical in shape.

Optionally, axially in the direction towards the second part, dimensions of the cross section of the inner circumferential surface of the first part tend to decrease.

Optionally, in the direction towards the first part axially, dimensions of the cross section of the inner circumferential surface of the second part tend to decrease.

Optionally, the slant angle of the inner circumferential surface of the first part relative to the central axis is greater than the self-lock angle between the first part and the central shaft, the slant angle of the inner circumferential surface of the second part relative to the central axis is greater than the self-lock angle between the second part and the central shaft.

Optionally, the slant angle of the inner circumferential surfaces of the first part and second part relative to the central axis is greater than arctan 0.1.

Optionally, cold stamping process is used to manufacture at least one of the first part and second part.

The present invention further provides a camshaft manufacturing method, including: installing the first part and second part of the cam respectively on the fitting section of the central shaft, the first part and second part are axially spaced, the central shaft has an axial hole, the hole extends to the fitting section; and then expanding the inserted part of the central shaft fitting section into the first part and second part, making the inserted part have its outer diameter increased and press tightly against the first part and second part radially.

Optionally, procedure to expand the inserted part of the fitting section in the first part and second part includes: inserting the expansion part into the hole, making the inserted part to expand radially.

Optionally, radially at least in one direction, dimensions of the expansion part are greater than the dimensions of the axial hole.

Optionally, procedure to expand the inserted part of the fitting section in the first part and second part includes: Introducing a fluid into the hole under pressure, making the inserted part to expand radially.

Optionally, the first part includes a cam profile used for engine braking, the second part has a cam profile used for normal ignition of the engine.

Optionally, except for axial thickness, the first part and second part are identical in shape.

Optionally, the first part and second part are totally identical in shape.

Optionally, in the direction towards the second part axially, dimensions of the cross section of the inner circumferential surface of the first part tend to decrease.

Optionally, in the direction towards the first part axially, dimensions of the cross section of the inner circumferential surface of the second part tend to decrease.

Optionally, the slant angle of the inner circumferential surface of the first part relative to the central axis is greater than the self-lock angle between the first part and the central shaft, the slant angle of the inner circumferential surface of the second part relative to the central axis is greater than the self-lock angle between the second part and the central shaft.

Optionally, the slant angle of the inner circumferential surfaces of the first part and second part relative to the central axis is greater than arctan 0.1.

Optionally, at least one of the first part and second part is manufactured by cold stamping process.

An embodiment of the present invention provides a camshaft, including:

A central shaft with fitting section, cross section profile of the outer circumferential surface of the fitting is all the same in axial position, the cross section profile includes a linear zone and a circular zone, the circular zone belongs to the same circle and includes multiple arcs, the linear zone belongs to the same polygon and includes multiple straight lines, the straight line and the arc are spaced in an interweaved manner circumferentially, and interconnected into the cross section profile;

Cam and drive unit installed on the fitting section of the central shaft;

End cap, the end cap is pressed into the center holes on both ends of the central shaft for sealing the ends of the central shaft.

According to a specific implementation method of the embodiment of the present invention, the circle and the polygon are concentric.

According to a specific implementation method of the embodiment of the present invention, the camshaft also comprises:

Journal, the journal has an outer cylindrical surface, the journal is used for rotating and supporting the whole camshaft, outer cylindrical surface of the journal is made on the outer circumferential surface of the central shaft at a certain interval, the outer cylindrical surface is arc connected with the circular zone and linear zone of the central shaft.

According to a specific implementation method of the embodiment of the present invention, the camshaft also includes:

Journal, the journal has an inner bore, the inner bore is round and diameter of the circle has a diameter identical to that of the inner bore of the central shaft.

According to a specific implementation method of the embodiment of the present invention, the drive unit has an inner bore to match with the central shaft, the inner bore is round and the circle has a diameter identical to the diameter of the circle to which the circular zone belongs.

According to a specific implementation method of the embodiment of the present invention, the drive unit has an inner bore, the inner bore includes a cambered surface to match with the circular zone of the central shaft.

According to a specific implementation method of the embodiment of the present invention, the outer cylindrical surface at one end of the end cap has a diameter slightly bigger than the inner hole of the central shaft, the outer cylindrical surface of the end cap is made by knurling process.

According to a specific implementation method of the embodiment of the present invention, cross section profile of the inner circumferential surface of the cam is identical to the cross section profile of the fitting section in shape.

According to a specific implementation method of the embodiment of the present invention, the cam has a pluralality of fitting sections respectively installed on the central shaft.

An embodiment of the present invention provides a camshaft manufacturing method, including:

Forging process is used for manufacturing the cam, edges of the inner circumferential surface of the cam as well as the inner circumferential surfaces of its two end faces are subjected to finish machining;

Machining process is used to manufacture the drive unit, edges of the inner circumferential surface of the drive unit as well as the inner circumferential surfaces of its two end faces are subject to finish machining;

The cam and the drive unit are installed on the central shaft having axial holes;

The part of the central shaft inserted into the cam and drive unit is expanded, so that the inserted parts have their outer diameter increased and pressed tightly against the cam radially.

According to a specific implementation method of the embodiment of the present invention, the expansion of the inserted part of the central shaft in the cam and drive unit includes:

Inserting the expansion part into the axial hole of the central shaft, making the inserted part expand radially.

According to a specific implementation method of the embodiment of the present invention, the expansion of the inserted part of the central shaft in the cam and drive unit includes:

Introducing a fluid under expansion pressure into the axial hole of the central shaft, making the inserted part expand radially.

According to a specific implementation method of the embodiment of the present invention, the central shaft is formed according to the following manner:

Form a tube with outer cylindrical surface by cold drawing;

Form a plural of circumferentially spaced planes on the outer cylindrical surface by cold drawing, the planes extend radially along the tube, making cross sectional profile of the outer circumferential surface of the tube include linear zone and circular zone, the circular zone belongs to the same circle and includes multiple arcs, the linear zone belongs to the same polygon and includes multiple straight lines, the straight line and the arc are spaced in an interweaved manner circumferentially, and interconnected into the cross sectional profile.

According to a specific implementation method of the embodiment of the present invention, before installing the cam on the central shaft, outer cylindrical surface is made on the outer circumferential surface of the central shaft at a present interval to form journals, the journals are used for rotating and supporting the whole camshaft, wherein the outer cylindrical surfaces are connected with the circular zone and linear zone of the central shaft.

Comparing with the prior technologies, technical solution of the present invention has the following advantages:

In the camshaft according to the present invention, outer circumferential surface of the central shaft fitting section of the camshaft is configured into a polygon, inner circumferential surfaces of the first cam and second cam are also configured into a polygon, the central shaft and the first cam and second cam are subject to force fit between the outer circumferential surface of the polygon and inner circumferential surface of the polygon, whereby a fixed and rotation resisting connection is formed between the two. Compared with the splined connection of prior camshaft, this camshaft has the advantages of higher torque transmission, simpler structure, simplified manufacturing process, shorter manufacturing time consumption and reduced cost.

Furthermore, the cam includes a first cam and a second cam that are mutually separated and axially spaced on the central shaft, and compared with one-piece cam, axial dimensions of the first cam and second cam are reduced, which can be formed by stamping process at a lower cost.

Furthermore, axially in the direction towards the second part, dimensions of the cross sectional of the inner circumferential surface of the first part tend to decrease. Axially in the direction towards the first part, dimensions of the cross sectional of the inner circumferential surface of the second part tend to decrease. During expansion, the first part and the second part can be in relative motion so that these two can press tightly against each other axially. During manufacturing, the first part and the second part can, before expansion, be put on the outside of the central shaft and made come into contact with each other axially or have a very small axial clearance there-between, and the relative motion between the first part and the second part during expansion is used to increase the axial pressing force or eliminate the axial clearance, thus, reducing the camshaft manufacturing difficulties.

In the camshaft, outer circumferential surface profile of the central shaft includes linear zone and circular zone arranged in an interweaved manner, and the linear zone belongs to the same polygon, the circular zone belongs to the same circle. When fitting with the cam, a fixed and rotation resisting connection can be realized between these two through fitting between the circular zone and the cam inner bore. This solution can be used to simplify the structure and manufacturing process of prior camshaft, shorten the time consumed for camshaft manufacturing and reduce the cost, while sufficiently higher torque transmission is guaranteed.

In the camshaft, the outer circumferential surface profile of the central shaft includes linear zone and circular zone arranged in an interweaved manner, and the linear zone belongs to the same polygon, the circular zone belongs to the same circle. When fitting with the cam, a fixed and rotation resisting connection can be realized between these two through fitting between the circular zone and the cam inner bore. This solution can be used to simplify the structure and manufacturing process of prior camshaft, shorten the time consumed for camshaft manufacturing and reduce the cost, while sufficiently higher torque transmission is guaranteed.

BRIEF DESCRIPTION OF THE DRAWINGS

For the purpose of a clearer description of the embodiments in this application or technical solutions in prior art, below is a brief introduction of the attached drawings needed to be used in the description of the embodiments or prior art. Apparently, the attached drawings in the following description are only some embodiments indicated in the present application. For ordinary technical personnel in the field, they may obtain other drawings according to these attached drawings without any innovative laboring.

DETAILED DESCRIPTION

To enable technical persons in this technical field to have a better understanding of the solutions of this application, below is a clear and complete description of the technical solutions in the embodiments of this application in conjunction with the drawings attached in the embodiments of this application. Apparently, the embodiments described herein are just part of the embodiments of this application and are not all embodiments. Based on these embodiments in this application, all other embodiments that may be obtained by ordinary technical persons in this field without any innovative laboring shall fall within the scope of protection of this application.

Embodiment 1

Figure 1:
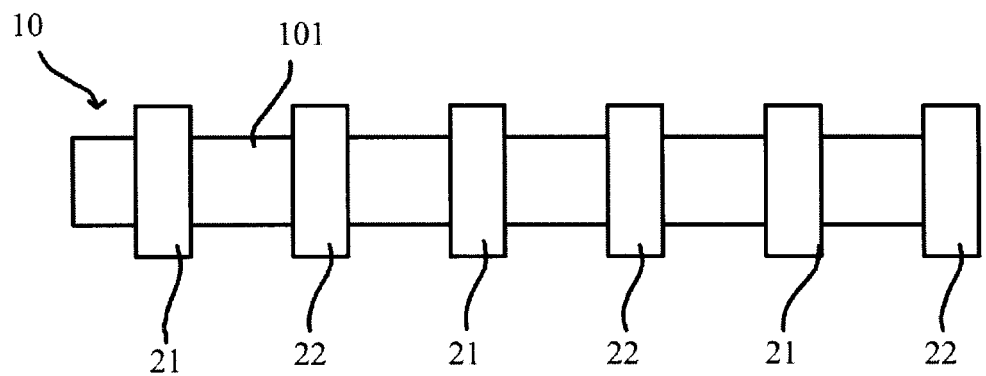
FIG. 1 is the front structure view of the camshaft in Embodiment 1 of the present invention.

An embodiment of the present invention provides a camshaft, as shown in FIG. 1, comprising a central shaft 10 and a plural of cams installed on the outside of central shaft 10. The plural of cams include a first cam 21, a second cam 22. The first cam 21 and the second cam 22 are respectively installed on the outside of central shaft 10 and axially spaced.

FIG. 1 exemplarily shows a camshaft having six cams, each cam on the camshaft corresponds with a cylinder, the first cam 21 and the second cam 22 are respectively connected with the central shaft 10 in a rotation resisting manner for synchronous rotation. The first cam 21 and the second cam 22 are respectively used for driving different air valves. In the embodiment illustrated by FIG. 1, the first cam 21 and the second cam 22 are neighboring each other, and there is no other cam between them. In other embodiments, other cams may be provided between the first cam 21 and the second cam 22.

Figure 3:
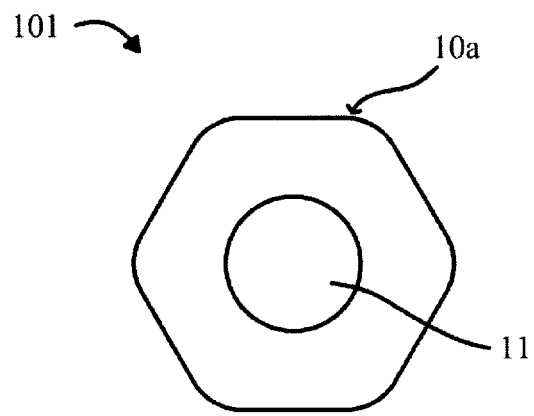
FIG. 3 is a schematic drawing showing a cross section of the central shaft of the camshaft in Embodiment 1 of the present invention.

Central shaft 10 has an axial hole 11, central shaft 10 has a fitting section 101. As shown in FIG. 3, outer circumference of the cross section of the fitting section 101 is a polygon in any axial position, specifically a hexagon. Besides being inside the first cam 21 and the second cam 22, the fitting section 101 is also positioned between two neighboring cams, in other words, the fitting section 101 extends from the first cam 21 to the second cam 22.

Figure 4:
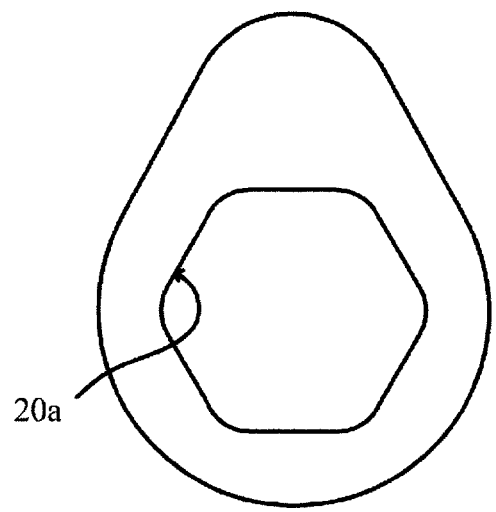
FIG. 4 is a schematic drawing showing cross sections of the first cam and the second cam of the camshaft in Embodiment 1 of the present invention.

Accordingly, as shown in FIG. 4, cross section of the inner circumferential surface 20*a* of the first cam 21 and the second cam 22 is a polygon, and the polygon of the first cam 21 and the second cam 22 is identical to the polygon of central shaft 10 in shape, which is also a hexagon.

Wherein, "cross section" means a section in perpendicular with the axial direction.

Figure 2:
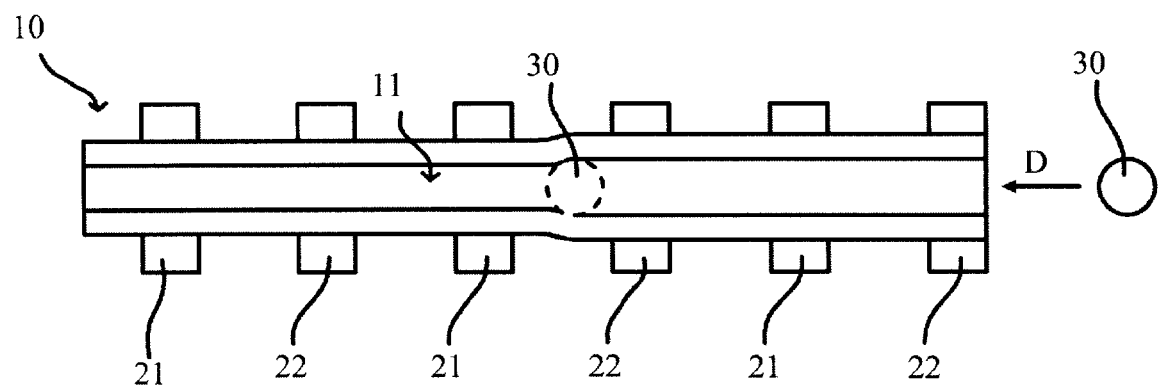
FIG. 2 is a schematic drawing showing the expansion of the camshaft by using an expansion part as described in Embodiment 1 of the present invention.

As shown in FIG. 2, the camshaft according to this embodiment can be assembled according to the following procedure: first put the first cam 21 and the second cam 22 on the outside of the central shaft 10, then insert an expansion part 30 into the hole 11 of the central shaft 10 in order to apply pressure to the inner wall of the hole 11, whereby, the central shaft 11 can have its outer diameter enlarged and can press tightly against the inner circumferential surface of the cam, thus, a fixed and rotation resisting fitting is realized between the two. In the embodiment shown in FIG. 2, the expansion part 30 is a steel ball with a diameter bigger than the diameter of the hole 11. In FIG. 2, the expansion part 30 enters the hole 11 from one end of the central shaft 10 in the inserting direction D, and moves axially to the other end in the hole 11. At the locations where the expansion part 30 passed through, diameter of the hole 11 is made bigger, and the central shaft 10 has a bigger diameter and presses tightly against the corresponding cam.

In other embodiments, the expansion part 30 may also be rigid parts of any other shape, the diameter of which shall be bigger than the diameter of the hole 11 at least in one direction, or the expansion part 30 can also be a fluid, for example, liquid, gas, etc.

From this, it can be seen that this solution configures the outer circumferential surface of the central shaft in the camshaft into a polygon, and also configures the inner circumferential surface of the first cam and the second cam into a polygon corresponding to the central shaft, the central shaft and the first cam and second cam are subject to force fit between the outer circumferential surface of the polygon and inner circumferential surface of the polygon, whereby a fixed and rotation resisting connection is formed between the two. Compared with the splined connection of prior camshaft, this camshaft has the advantages of higher torque transmission and simpler structure.

Besides hexagon, the polygon can also be any other polygons. Number of sides of the polygon can be integral multiple of the number of engine cylinders, for instance, 1×, 2×, etc. For example, for a 3-cylinder or 6-cylinder engine, the aforesaid polygon may be a hexagon; for a 4-cylinder engine, the aforesaid polygon may be a quadrangle. Phase difference between the first cam 21 and the second cam 22 is n*(360°/N), where N stands for the number of sides of the polygon or the number of engine cylinders, n stands for 1 or an integer bigger than 1.

As shown in FIG. 3 and FIG. 4, with respect to the outer circumferential surface 10*a* of the central shaft 10 and the inner circumferential surface 20*a* of the first cam 21 and the second cam 22, arc transition is used between any two neighboring sides of the polygon. In such a manner, sharp area can be avoided between the two sides, thus, reducing any stress concentration.

Embodiment 2

This embodiment provides a camshaft. In this embodiment, structure of the first cam 21 and the second cam 22 of the camshaft is changed based on Embodiment 1.

Figure 5:
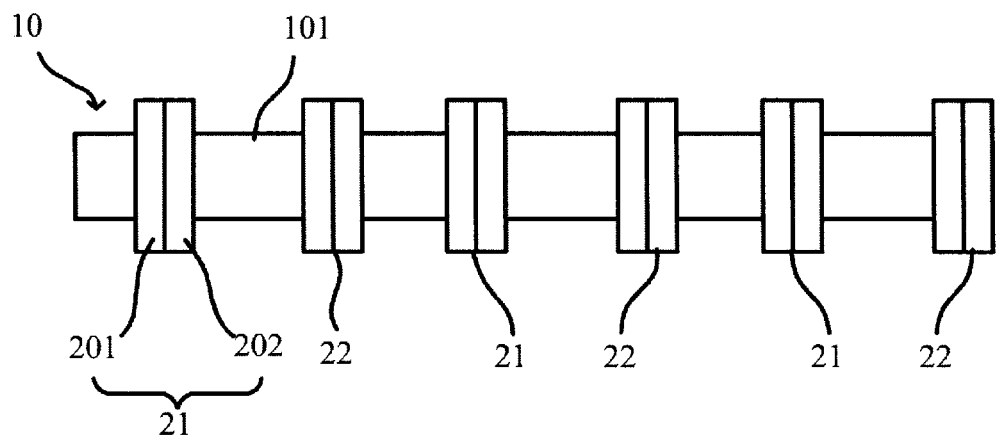
FIG. 5 is a schematic front structure view of the camshaft in Embodiment 2 of the present invention.

Referring to FIG. 5, at least one of the first cam 21 and second cam 22 includes an axially spaced first part 201 and second part 202, the first part 201 and the second part 202 are respectively installed on the central shaft 10 and fixed on the central shaft 10 axially, radially and circumferentially, namely, the first part 201 and the second part 202 are totally fixed with the central shaft 10, and after the assembly is completed, they do not engage in any relative motion to the central shaft 10 axially, radially and circumferentially, in which it is also possible to configure in such a manner that all cams installed on the central shaft 10 include the first part and second part; and it is also possible to configure in such a manner that part of the cams installed on the central shaft 10 include the first part and the second part while the remaining cam(s) may be cam(s) formed in one piece.

In the embodiment shown in FIG. 5, the first cam 21 and the second cam 22 installed on the central shaft 10 both include the first part 201 and the second part 202. FIG. 5 only indicates the first part and the second part of one of the cams - - - the first cam 21.

Figure 6:
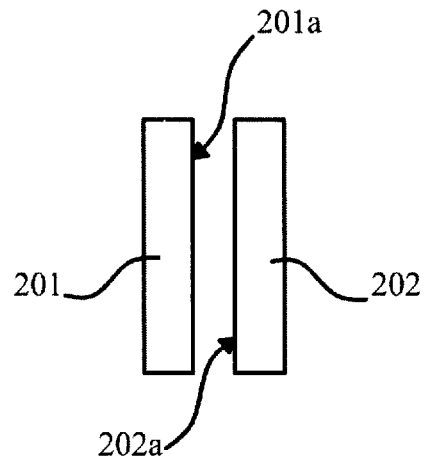
FIG. 6 is a schematic front structure view of the first part and the second part of the cam, which have not been installed on the central shaft.

The first part 201 and the second part 202 are independent of each other and respectively installed on the central shaft 10. As shown in FIG. 6, the first part 201 has a first axial end face 201a, the second part 202 has a second axial end face 202a, the first axial end face 201a and the second axial end face 202a are arranged face to face. It can be seen that before assembly, the first part 201 and the second part 202 are two parts independent of each other, the first part 201 and the second part 202 are manufactured separately, and are respectively installed concentrically on the outside of the central shaft 10 through assembly.

After the assembly is completed, the first axial end face 201a of the first part 201 and the second axial end face 202a of the second part 202 can be separated from each other, that is, not in contact with each other; or the first axial end face 201a and the second axial end face 202a can also be in contact with each other.

As opposed to one-piece cam, the cam in this embodiment is divided into an axially spaced first part 201 and second part 202, each part has a smaller axial thickness, thus, stamping, for instance, cold stamping process can be used for manufacturing at a lower cost.

According to the present invention, the first part 201 and second part 202 of the same cam can only drive the same air valve or the same bank of air valves, but cannot drive different air valve. The first part 201 and second part 202 may be totally identical in shape, for example, identical cross sectional shape, identical axial section shape and axial thickness, etc. Or, the first part 201 and the second part 202 may also have different axial thickness while other identical shapes retain. Herein, "axial section" refers to the section obtained as a result of cutting away in a direction parallel with the axial direction.

In some of other variations of this embodiment, the first part 201 and second part 202 are different in shape. The first part 201 includes a cam profile used for engine braking, the second part 202 includes a cam profile used for normal operation of the engine. When an engine works normally and used to provide drive force to the automobile wheels, the second part 202 drives the air valve for motion; when the engine is required for braking, the first part 201 drives the air valve for motion.

Figure 7:
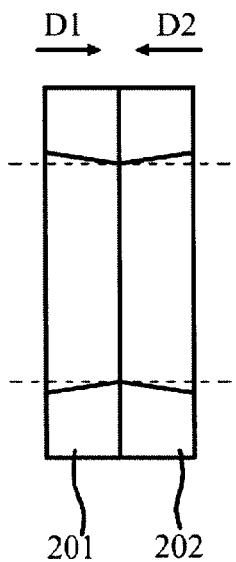
FIG. 7 is a cutaway view of the first cam and the second cam of the camshaft in Embodiment 2 of the present invention.

Furthermore, as shown in FIG. 7, axially in the direction towards the second part 202, dimensions of the cross section of the inner circumferential surface 20a of the first part 201 tend to decrease. In the axial direction, inner circumferential surface of the first part 201 appears to be a bevel inclining towards the second part 202, and is not in parallel with the axial direction.

Figure 8:
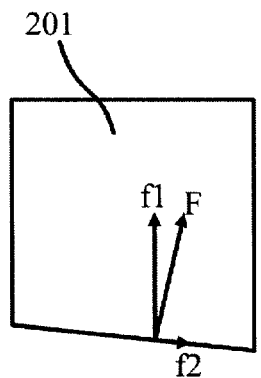
FIG. 8 shows the stresses taken by the inner circumferential surface of the first cam during expansion.

As shown in FIG. 8, when the expansion part is inserted into the hole 11 for expansion treatment of the central shaft 10, as the outer diameter of the central shaft 10 expands, the central shaft 10 and the first part 201 will gradually begin to press against each other, thus, the inner circumferential surface of the first part 201 will receive a pressing force F that is perpendicular to the inner circumferential surface. The pressing force F can be decomposed into a radial component force f1 towards the outside along the radial direction, as well as an axial component force f2 axially towards the second part 202. Under the action of axial component force f2, the first part 201 will move towards the second part 202 as a result of mutual pressing between the central shaft 10 and the first part 201, resulting in a tighter axial fit between the first part 201 and the second part 202.

Likewise, the second part 202 may also be configured as such: axially in the direction towards the first part 201, cross sectional dimensions of the inner circumferential surface 20a of the second part 202 tend to decrease. Thus, when the expansion part is inserted into the hole 11 for expansion treatment of the central shaft 10, the second part 202 will move towards the first part 201 as a result of mutual pressing between the central shaft 10 and the second part 202, further adding to the tighter axial fit between the first part 201 and the second part 202.

It should be noted that when the inner circumferential surface of the first part 201 is a bevel not in parallel with the axial direction, slant angle of this bevel relative to the center axis is preferably greater than the self-lock angle between the first part 201 and the central shaft 10; similarly, when the inner circumferential surface of the second part 202 is a bevel not in parallel with the axial direction, slant angle of this bevel relative to the center axis is preferably greater than the self-lock angle between the second part 202 and the central shaft 10. In this manner, during expansion treatment, the problem that the first 201 and the second part 202 cannot move axially due to self-lock effect can be avoided.

Optionally, the slant angle of the inner circumferential surface of the first part 201 and the second part 202 relative to the center axis is greater than arctan 0.1.

In some of the variations of this embodiment, for each cam, while inclusion of the axially spaced first part and second part is retained, the following configuration can also be made: along the axial direction, cross section dimensions of the inner circumferential surfaces of the first part and the second part are the same, the inner circumferential surfaces of the first part and the second part are in parallel with the axial direction.

In some of the variations of this embodiment, for each cam, while inclusion of the axially spaced first part and second part is retained, cross section shape of the inner circumferential surface of the cam as well as the outer circumferential surface of the central shaft can be configured in other shapes but not limited to polygon, for example, it can also be round among other shapes.

Embodiment 3

This embodiment provides an engine, including the camshaft mentioned in the above Embodiment 1 and Embodiment 2, as well as a first air valve, a second air valve, wherein, the first cam 21 is used for driving the first air valve but do not drive the second air valve, the second cam 22 is used for driving the second air valve but do not drive the first air valve.

The first air valve and the second air valve may be respectively the air valves of the same cylinder, or may be air valves of different cylinders.

When the cam includes a first part 201 and a second part 202, the first part 201 and the second part 202 of the same cam drive at least the same air valve.

Embodiment 4

This embodiment provides a camshaft manufacturing method, structure of the camshaft of this embodiment may refer to the one as shown in FIG. 1 and FIG. 3, the central shaft 10 has a fitting section 101, circumference of the cross section of the fitting section 101 is a polygon at any axial position, and the central shaft 10 has an axial hole 11, the hole 11 axially extends to the fitting section 101. Structure of the cam may refer to the structure of the first cam 21 and second cam 22 as shown in FIG. 1 and FIG. 4, cross section of the inner circumferential surface of the cam is a polygon.

Control method of this embodiment includes the following steps:

S11: Installing the cam on the fitting section of the central shaft.

S12: Expanding the part of the fitting section 101 inserted in the cam, making the inserted part have its outer diameter increased and press tightly against the cam radially.

Before expansion, outer diameter of the fitting section 101 is slightly smaller than inner diameter of the cam, after inserting the fitting section 101 into the cam, very small radial clearance may exist between the outer circumferential surface of the fitting section 101 and the inner circumferential surface of the cam. After expansion, part of the fitting section 101 inserted into the cam has a bigger outer diameter, the radial clearance between the cam and the inserted part is eliminated, thus, resulting in a tight fit between the cam and the inserted part of the fitting section 101, whereby the cam is fixed on the central shaft 10 axially, radially and circumferentially.

With respect to S12, when expanding the part of the fitting section 101 inserted into the cam, the expanding procedure includes: inserting an expansion part into the hole of the central shaft, making the inserted part of the fitting section 101 expand radially.

Wherein, the expansion part is a rigid part, then, radially at least in one direction, dimensions of the expansion part should be bigger than dimensions of the hole, otherwise, expansion cannot be affected.

In some embodiments, the expansion part is rigid spherical part, diameter of the spherical part is bigger than the diameter of the hole 11. After the cam is put on the central shaft 10, the steel ball is inserted into the hole 11 from one axial end of the central shaft 10, then is pushed to move axially to the other end in the hole 11. At the locations coming into contact with the steel ball, diameter of the central shaft 10 is expanded bigger. Thus, when the steel ball moves to the inserted part of the fitting section, the inserted part will be expanded.

In some other embodiments, the expansion part is a fluid, and when expanding the part of the fitting section inserted into the cam: introducing a fluid into the hole 11 under pressure, making the inserted part of the fitting section to expand radially.

It should be noted that during expansion by using a fluid, one end of the hole 11 should be blocked. If the hole 11 is a blind hole, the fluid may be directly introduced into it. If the hole 11 is a through hole, then one end of the hole 11 shall be blocked in the first place, and the fluid can be introduced into the hole 11 from the other end of the hole 11, whereby the hole 11 of the central shaft 10 is expanded by making use of the fluid pressure.

In this embodiment, arc transition is provided between any neighboring sides of the polygon as far as the cross section of the outer circumferential surface of the central shaft 10 as well as the cross section of the inner circumferential surface of the cam are concerned, so as to reduce the sharp area form between the two sides and reduce the stress concentration.

Wherein, each of the cams may be one-piece cam and can be manufactured by using casting process.

Embodiment 5

This embodiment provides a camshaft manufacturing method. In this embodiment, the structure of the cam may refer to FIG. 5, including a first part 201 and second part 202; the central shaft 10 has an axial hole 11.

The manufacturing method of this embodiment includes the following steps:

S21: Installing the first part 201 and second part 202 of the cam respectively on the outside of the central shaft 10, and arranging the first part 201 and second part 202 axially and having them pressing against each other;

S22: Expanding the hole 11 of the central shaft 10, making the part of the central shaft 10 inside the cam increase its outer diameter and press tightly against the cam.

In Step S22, when expanding the hole 11 of the central shaft 10, the expanding method is identical to Embodiment 4, thus, is not repeated here.

Wherein, at least one of the first part 201 and second part 202 is formed by using cold stamping process.

In some embodiments, the first part 201 and second part 202 may be different in shape. Wherein, the first part 201 includes a cam profile used for engine braking, the second part 202 includes a cam profile used for normal operation of the engine. When normal operation of the engine is used for providing drive force for the wheels, the second part 202 drives the air valve for motion; when the engine is needed for braking, the first part 201 drives the air valve for motion.

In some other embodiments, the first part 201 and second part 202 are totally identical in shape. Or except for different axial thickness, all other shapes are identical. In this embodiment, it is configured that the first part 201 and second part 202 have the same axial dimensions to allow for easy machining.

Furthermore, axially in the direction towards the second part 202, cross section dimensions of the inner circumferential surface 20a of the first part 201 tend to decrease. Shape of the first part 201 may refer to FIG. 7, along the axial direction, the inner circumferential surface of the first part 201 appears to be a bevel inclining towards the second part 202.

It can be seen from the above steps that before the expansion, the first part 201 and the second part 202 axially press against each other, they are in contact with each other or there has already been a certain axial pressing force between them. During expansion treatment in Step S24, the first part 201 will, along with the mutual pressing between the central shaft 10 and the first part 201, move towards the second part 202, enabling a tighter axial fit between the first part 201 and second part 202.

Likewise, axially in the direction towards the first part 201, cross section dimensions of the inner circumferential surface 20a of the second part 202 tend to decrease. During the expansion treatment in Step S24, the second part 202 will move towards the first part 201 as a result of mutual pressing between the central shaft 10 and the second part 202, further adding to the tighter axial fit between the first part 201 and the second part 202.

It should be noted that when the inner circumferential surface of the first part 201 is a bevel not in parallel with the axial direction, slant angle of this bevel relative to the center axis is preferably greater than the self-lock angle between the first part 201 and the central shaft 10; similarly, when the inner circumferential surface of the second part 202 is a bevel not in parallel with the axial direction, slant angle of this bevel relative to the center axis is preferably greater than the self-lock angle between the second part 202 and the central shaft 10. In this manner, during expansion treatment, the problem that the first 201 and the second part 202 cannot move axially due to self-lock effect can be avoided.

Optionally, slant angle of the inner circumferential surfaces of the first part 201 and second part 202 relative to the center axis is greater than arctan 0.1.

In this embodiment, cross section shape of the inner circumferential surfaces of the first part 201 and second part 202 of the cam as well as that of the outer circumferential surface of the fitting section 101 are not defined, which may be a circle or a polygon.

Embodiment 6

Figure 9:
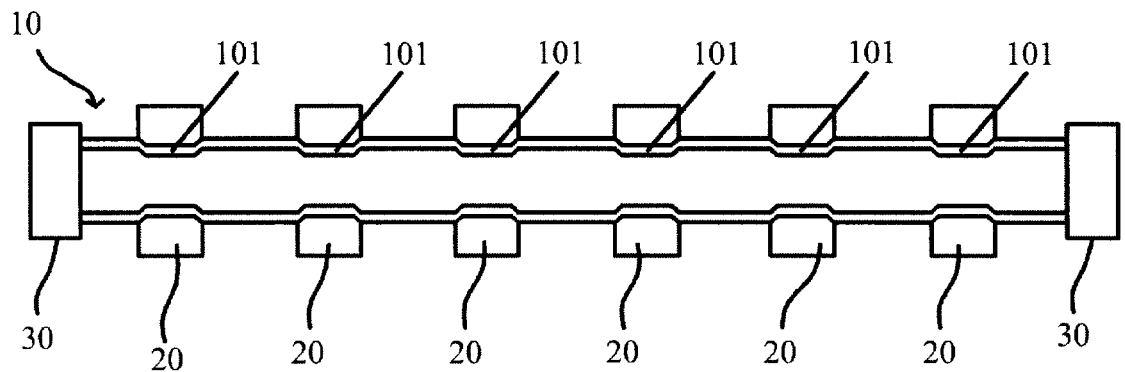
FIG. 9 is a cutaway structural drawing of the camshaft in Embodiment 1 of the present invention.

This embodiment of the present invention provides a camshaft, as shown in FIG. 9, including a central shaft 10 as well as cam 20 installed on the central shaft 10. Wherein, cam 20 has a plural of cams respectively installed on the central shaft 10 and axially spaced.

FIG. 9 illustratively shows a camshaft with 6 cams 20, each of the cams 20 on the camshaft corresponds with an engine cylinder, each cam 20 is respectively connected with the central shaft 10 in a rotation resisting manner for synchronous rotation of the two. Each cam 20 is respectively used for driving different engine air valve.

Figure 10:
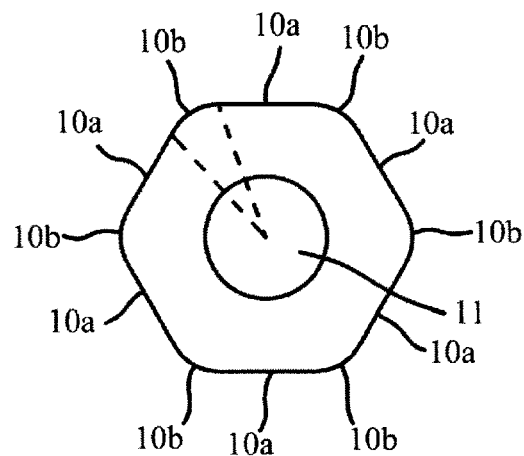
FIG. 10 is a cross section schematic drawing of the central shaft of the camshaft in Embodiment 1 of the present invention.

The central shaft 10 has a fitting section 101 used for fitting with cam 20, and the cam is installed on the fitting section 10. Referring to FIG. 10, FIG. 10 shows the cross section profile of the central shaft 10 at the fitting section 101.

Cross section profile of the fitting section 101 includes: linear zone 10a and circular zone 10b, wherein the circular zone 10a belongs to a circle and includes a plural of arcs, the linear zone 10a belongs to a polygon and includes a plural of straight lines, each line and each arc are circumferentially spaced in an interweaved manner and are interconnected into the cross section profile of the outer circumferential surface. In this embodiment, as shown in FIG. 10, the polygon is a hexagon.

It is noteworthy that cross section of the outer circumferential surface of the fitting section 101 has the same profile at any axial position in this embodiment. In other words, the outer circumferential surface of the fitting section 101 can be formed by axially stretching any profile having the aforesaid circular zone and linear zone, wherein, "cross section" refers to a cross section that is perpendicular to the axial direction.

Figure 11:
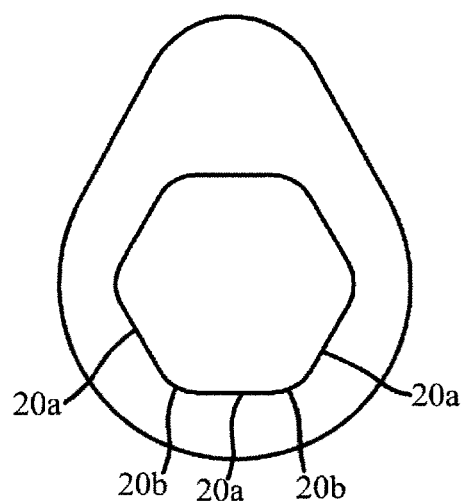
FIG. 11 is a cross section schematic drawing of the cam of the camshaft in Embodiment 1 of the present invention.

Furthermore, referring to FIG. 11, the cross sectional profile and shape of the inner circumferential surface of the cam 20 are identical to the cross section profile and shape of the outer circumferential surface of the fitting section 101 on the central shaft 10. In other words, the cross sectional profile of the inner circumferential surface of the cam 20 also include: linear zone 20a and circular zone 20b, the circular zone 20b belongs to a circle and includes a plural of arcs, the linear zone 20a belongs to a polygon and includes a plural of straight lines, the straight line and the arc are axially spaced in an interweaved manner. FIG. 11 only indicates partial linear zone 20a and circular zone 20b of the cam 20.

Speaking of the fitting section 101 on the central shaft 10, when installing the fitting section 101 on the cam 20, the circular zone 10b matches with the circular zone 20b of the inner bore of the cam 20. Specifically speaking, the shape of the circular zone 10b fits well with the circular zone 20b of the inner bore of the cam 20, making the circular zone 10b (FIG. 10) of the outer circumferential surface of the central shaft 10 fit well with the circular zone 20b (FIG. 11) of the inner bore of the cam 20.

From this, it can be seen that in this solution, outer circumferential surface profile of the central shaft in this camshaft includes linear zone and circular zone arranged in an interweaved manner, and the linear zone belongs to the same polygon, the circular zone belongs to the same circle. When fitting with the cam, a concentric assembly of the two can be realized by fitting the circular zone with the corresponding circular zone inside the cam, and a fixed and rotation resisting connection can be realized between these two through fitting between the circular zone and the cam inner bore. Compared with the prior camshafts using splined connection, this solution can transmit a higher torque and its structure is more simplified.

Wherein, the circle to which the circular zone 10b (or 20b) belongs and the polygon to which the linear zone 10a (or 20a) belongs are concentric, in other words, the geometrical centers of these two coincide.

Further referring to FIG. 9, the camshaft also includes bearing 30, the bearing 30 is installed on the fitting section 101 of the central shaft 10, the bearing 30 has inner bore (not shown in the figure) for fitting with the central shaft 10, the inner bore is round and diameter of the inner bore is identical to the diameter of the circle to which the circular 10b belongs.

In other embodiments, the inner bore of the bearing 30 may also not be round, but the inner bore 30 of the bearing 30 shall at least include the cambered surface that can fit with the circular zone 10b of the central shaft 10. In other words, the cross sectional shape of inner bore of the bearing 30 may be a combination of multiple sections of lines, and in such multiple sections of lines, at the location corresponding with the circular zone 10b of the central shaft 10, there must be at least one or more line sections that can fit with the corresponding circular zone 10.

Here, besides hexagon, the aforesaid polygon can also be any other polygons. The number of sides of the polygon can be integral multiple of the number of engine cylinders, for instance, 1×, 2×, etc. For example, for a 3-cylinder or 6-cylinder engine, the aforesaid polygon may be a hexagon; for a 4-cylinder engine, the aforesaid polygon may be a quadrangle. Phase difference between the first cam 21 and the second cam 22 is n*(360°/N), where N stands for the number of sides of the polygon or the number of engine cylinders, n stands for 1 or an integer bigger than 1.

In some other embodiments, it can also be possible to configure the cross sectional profile of the inner circumferential surface of the cam in the aforesaid shape that includes linear zone and circular zone, while no limit is put on the profile and shape of the outer circumferential surface of the central shaft, which can be in a cylindrical shape.

Embodiment 7

This embodiment provides a camshaft manufacturing method, the method includes the following steps:

S11: Manufacturing at least one of the first part and second part of the cam by using cold stamping process;

S12: Installing the first part and second part respectively on the central shaft.

Figure 12:
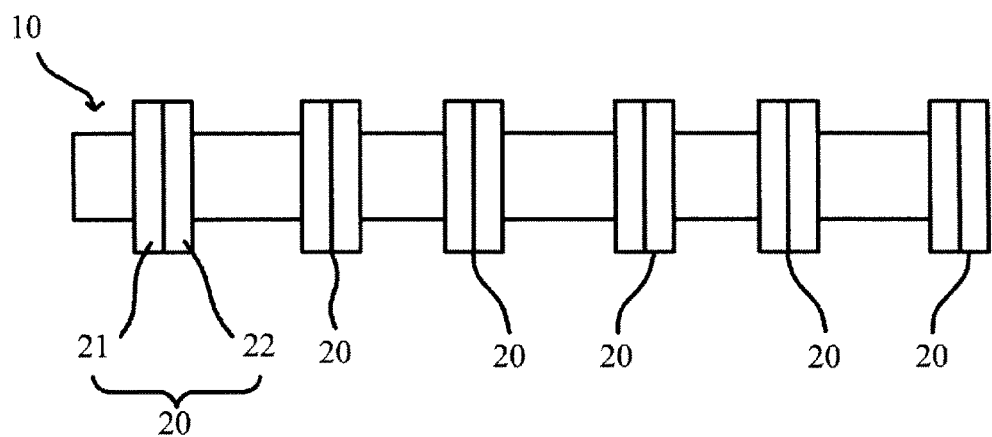
FIG. 12 is a schematic drawing of the camshaft corresponding with the manufacturing method in Embodiment 2 of the present invention.

Referring to FIG. 12, at least one cam 20 includes an axially spaced first part 21 and second part 22, the first part 21 and the second part 22 are respectively installed on the central shaft 10 and are fixed on the central shaft 10 axially, radially and circumferentially. In other words, the first part 21 and second part 22 are totally fixed with the central shaft 10, and after the assembly is completed, they cannot move relative to the central shaft 10 axially, radially and circumferentially.

Wherein, it can be configured in such a manner that all cams installed on the central shaft 10 include the first part and second part; it can also be configured in such a manner that part of cams installed on the central shaft include the first part and the second part, while the remaining cam(s) may be cam(s) formed in one piece.

Figure 13:
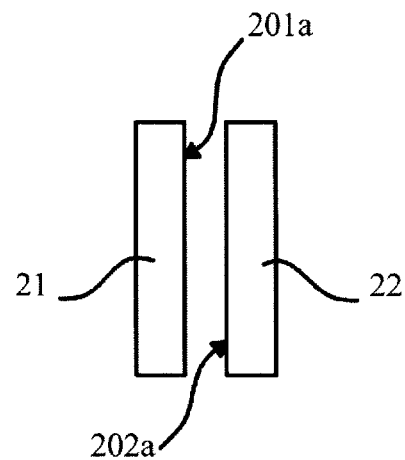
FIG. 13 is a schematic front structure view of the first part and the second part of the cam, which have not been installed on the central shaft.

In the embodiment shown in FIG. 12, cams 20 installed on the central shaft 10 all include the first part 21 and the second part 22. FIG. 13 only indicates the first part and second part of only one of cams - - - the first cam 21.

Furthermore, the manufacturing method according to this embodiment also includes Step S13.

Step S13: The first part 21 and second part 22 of the cam 20 are respectively installed on the central shaft 10 and are configured to be used for driving the same engine air valve.

It can be seen that the first part 21 and the second part 22 are independent of each other and respectively installed on the central shaft 10. As shown in FIG. 13, the first part 21 has a first axial end face 201a, the second part 22 has a second axial end face 202a, the first axial end face 201a and the second axial end face 202a are arranged face to face. It can be seen that before assembly, the first part 21 and the second part 22 are two parts independent of each other, the first part 21 and the second part 22 are manufactured separately, and are respectively installed concentrically on the outside of the central shaft 10 through assembly.

After the assembly is completed, the first axial end face 201a of the first part 21 and the second axial end face 202a of the second part 22 can be separated from each other, that is, not in contact with each other; or the first axial end face 201a and the second axial end face 202a can also be in contact with each other. During lubrication, the clearance between the first part and the second part can be used to deliver lubricant for lubricating the cam.

As opposed to one-piece cam, the cam in this embodiment is divided into an axially spaced first part 21 and second part 22, each part has a smaller axial thickness, thus, stamping, for instance, cold stamping process can be used for manufacturing at a lower cost.

The first part 21 and second part 22 may be totally identical in shape, for example, identical cross sectional shape, identical axial section shape and axial thickness, etc. Or, the first part 21 and the second part 22 may also have different axial thickness while other identical shapes retain. Herein, "axial section" refers to the section obtained as a result of cutting away in a direction parallel with the axial direction.

In some of other variations of this embodiment, the first part 21 and second part 22 are different in shape. The first part 21 includes a cam profile used for engine braking, the second part 22 includes a cam profile used for normal operation of the engine. When an engine works normally and used to provide drive force to the automobile wheels, the second part 22 drives the air valve for motion; when the engine is required for braking, the first part 21 drives the air valve for motion.

Furthermore, method of this embodiment also includes Step S14.

Step S14: Expanding the part of the central shaft 10 that is inserted in the first part 21 and second part 21, making the inserted part have its outer diameter increased and press tightly against the first part 21 and second part 22 radially.

Before expansion, outer diameter of the fitting section 101 may be slightly smaller than inner diameter of the cam 20, after inserting the fitting section 101 into the cam 20, a very small radial clearance may exist between the outer circumferential surface of the fitting section 101 and the inner circumferential surface of the cam 20. After expansion, part of the fitting section 101 inserted into the cam 20 has its outer diameter increased, the radial clearance between the cam 20 and the inserted part of the fitting section 101 is eliminated, thus, resulting in a tight fit between the cam 20 and the inserted part of the fitting section 101, whereby the cam 20 is fixed on the central shaft 10 axially, radially and circumferentially.

Figure 14:
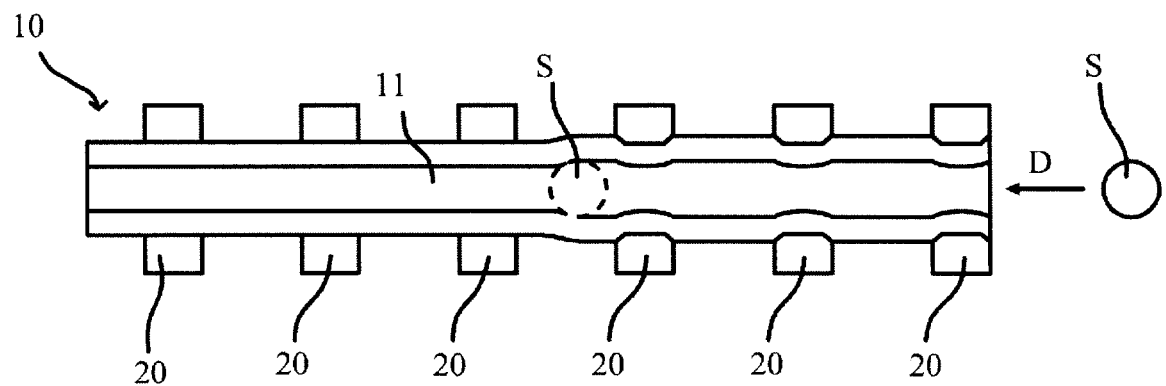
FIG. 14 is a cutaway structure schematic showing the camshaft in Embodiment 2 of the present invention, which shows the central shaft expansion process.

In this embodiment, referring to FIG. 14, the central shaft 10 has an axial hole 11, wherein the axial hole 11 may be a through hole or a blind hole, may be one hole or two holes respectively opening towards the two axial ends of the central shaft. However, it should be noted that the axial hole 11 should extends to each of the locations needed to be expanded.

Speaking of Step 14, when expanding the part of the fitting section 101 inserted in the cam 20, the expanding procedure includes: inserting the expansion part S into the axial hole 11 of the central shaft 10, making the inserted part of the fitting section 101 expand radially.

Herein, the expansion part S is a rigid part, then, radially at least in one direction, dimensions of the expansion part S should be bigger than the dimensions of the axial hole 11. Otherwise, the expansion effect cannot be achieved.

In some embodiments, the expansion part 30 is rigid spherical part, for example, steel ball. Diameter of the steel ball is bigger than the diameter of the hole 11. After the cam 20 is put on the central shaft 10, the steel ball is inserted into the hole 11 from one axial end of the central shaft 10, then is pushed to move axially to the other end in the hole 11. At the locations coming into contact with the steel ball, diameter of the central shaft 10 is expanded bigger. Thus, when the steel ball moves to the inserted part of the fitting section, the inserted part will be expanded.

In some other embodiments, the expansion part may be a fluid, and when expanding the part of the fitting section inserted into the cam: introducing a fluid into the hole 11 under pressure, making the inserted part of the fitting section to expand radially.

It should be noted that during expansion by using a fluid, one end of the hole 11 should be blocked. If the hole 11 is a blind hole, the fluid may be directly introduced into it. If the hole 11 is a through hole, then one end of the hole 11 shall be blocked in the first place, and the fluid can be introduced into the hole 11 from the other end of the hole 11, whereby the hole 11 of the central shaft 10 is expanded by making use of the fluid pressure.

Embodiment 8

This embodiment provides a camshaft manufacturing method, the manufacturing method includes:

S21: forming a central shaft having an axial hole;

S22: installing the cam on the central shaft.

In Step S21, formation of the central shaft includes the following several sub-steps:

S211: forming a tubular part having outer cylindrical surface by using cold drawing process;

S212: forming a plural of circumferentially spaced planes on the outer cylindrical surface by cold drawing, the planes extend radially along the tube, making cross section profile of the outer circumferential surface of the tube include linear zone and circular zone, the circular zone belongs to the same circle and includes multiple arcs, the linear zone belongs to the same polygon and includes multiple straight lines, the straight line and the arc are spaced in an interweaved manner circumferentially.

Herein, cross sectional shape of the tubular part may refer to FIG. 10.

The manufacturing method of this embodiment uses cold drawing process to form the tubular part, and uses cold drawing process to form the planes on the outer cylindrical surface of the tubular part, whereby a high precision can be ensured for the circular zone and linear zone of the tubular part, and there is no longer any need for further machining, thus, reducing the manufacturing cost of the camshaft.

In this embodiment, the circle to which the aforesaid circular zone belongs to and the polygon to which the linear zone belongs to are concentric. Configuration of the number of polygon sides is identical to the configuration mentioned in Embodiment 6.

Furthermore, before "installing the cam on the central shaft" in Step S22, it also includes Step S23: using a cold stamping process to form the first part and second part of the cam. Herein, there is no time sequence relation between Step S23 and Step S21.

In this embodiment, structure of the first part and second part of the cam is identical to Embodiment 7, and a reference may be made to FIG. 12 and FIG. 13.

Cross sectional shape of the inner circumferential surface of the first part and second part of the cam is identical to the cross sectional shape of the outer circumferential surface of the central shaft, cross section shape of the inner circumferential surfaces of the first part and second part may refer to FIG. 11. When installing the cam on the central shaft, the outer circumferential surface of the central shaft matches with the inner circumferential surfaces of the first part and second part.

In other words, in Step S23, the cross section of the inner circumferential surfaces of the first part and second part of the cam formed includes linear zone and circular zone, the circular zone belongs to one circle and includes a plural of arcs, the linear zone belongs to one polygon and includes a plural of straight lines, the straight lines and the arcs are circumferentially spaced in an interweaved manner.

Herein, speaking of the cross section of the inner circumferential surface of the cam, the circle to which the circular zone belongs and the polygon to which the linear zone belongs may be concentric.

After "installing the cam on the central shaft" in Step S22, it also includes the procedure for expanding the part of the central shaft inserted in the cam, the procedure is identical to Embodiment 7, thus, will not be repeated here.

In some of the other embodiments, in the camshaft manufacturing methods, Step S21 may also be completed by using prior methods instead of the method used in Steps S211~S212 of this embodiment. Meanwhile, Step S23 of this embodiment is used for manufacturing the cam.

In some other embodiments, Step S211~Step 212 can be used for manufacturing other tubular parts than the central shaft. Step S24 can also be used for manufacturing other cams than camshafts.

Embodiment 9

Figure 15:
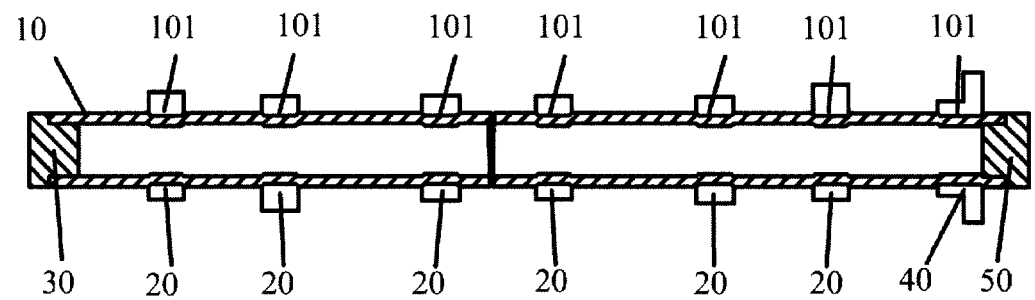
FIG. 15 is a cutaway structure view of a camshaft provided in embodiments of the present invention.

This embodiment of the present invention provides a camshaft, as shown in FIG. 15, including a central shaft 10 and cam 20 installed on the central shaft 10. Wherein, cam 20 stands for a plural of cams respectively installed on the central shaft 10 and axially spaced.

FIG. 15 exemplarily shows a camshaft having six cams 20, each cam 20 on the camshaft corresponds with a cylinder, each cam 20 is respectively connected with the central shaft 10 in a rotation resisting manner for synchronous rotation between the two. Each cam 20 is respectively used for driving different air valve of the engine.

Figure 16:
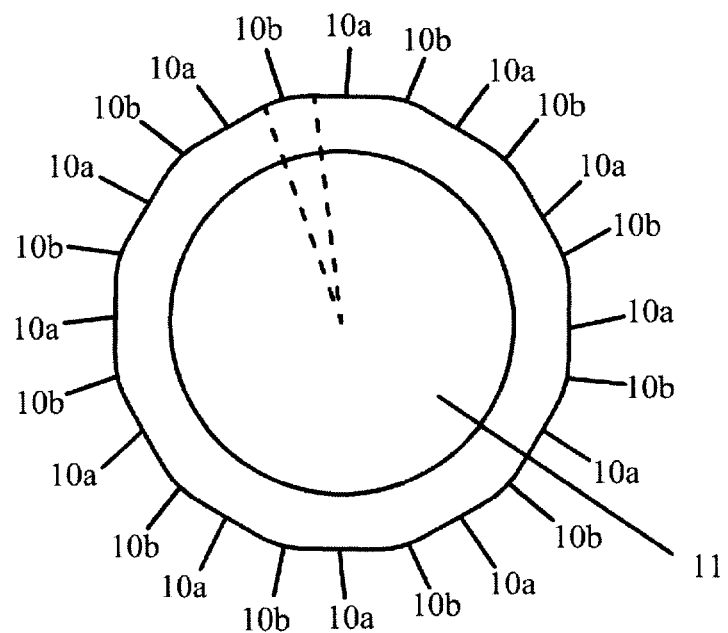
FIG. 16 is a cross section schematic view of the central shaft of a camshaft provided in the embodiments of the present invention.

Central shaft 10 has a fitting section 101 used for fitting with cam 20, the cam is then installed on the fitting section 101. Referring to FIG. 16, FIG. 16 shows the cross sectional profile of the central shaft 10 at the fitting section 101.

Cross sectional profile of the fitting section 101 includes: linear zone 10a and circular zone 10b, wherein the circular zone 10a belongs to a circle and includes a plural of arcs, the linear zone 10a belongs to a polygon and includes a plural of straight lines, each line and each arc are circumferentially spaced in an interweaved manner and are interconnected into the cross section profile of the outer circumferential surface. In this embodiment, as shown in FIG. 16, the polygon is a dodecagon.

It is noteworthy that cross section of the outer circumferential surface of the fitting section 101 has the same profile at any axial position in this embodiment. In other words, the outer circumferential surface of the fitting section 101 can be formed by axially stretching any profile having the aforesaid circular zone and linear zone, wherein, "cross section" refers to a cross section that is perpendicular to the axial direction. Outer cylindrical surface is made on the outer circumferential surface of the central shaft 10 at a certain interval to form journals 60, journal 60 is used for rotating and supporting the whole camshaft, the outer cylindrical surfaces are connected with the circular zone and linear zone.

Figure 18:
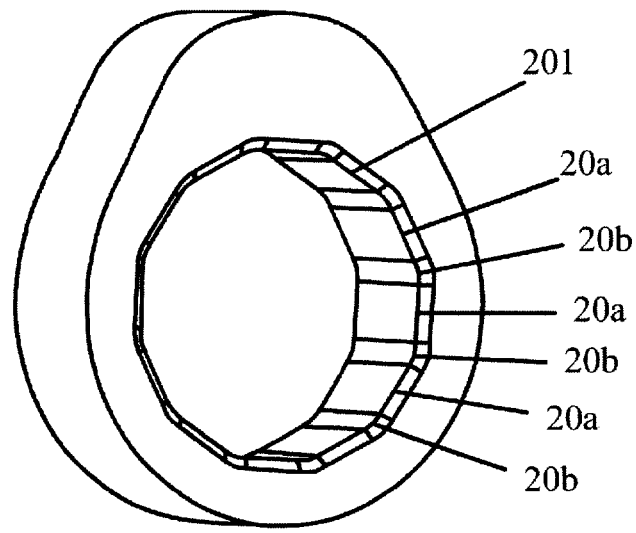
FIG. 18 is a schematic view showing the cam of a camshaft provided in the embodiments of the present invention.

Furthermore, referring to FIG. 18, cross sectional profile and shape of the inner circumferential surface of the cam 20 is identical to the cross sectional profile and shape of the outer circumferential surface of the fitting section 101 on the central shaft 10. In other words, the cross sectional profile of the inner circumferential surface of cam 20 also includes: linear zone 20a and circular zone 20b, the circular zone 20b belongs to a circle and includes a plural of arcs, the linear zone 20a belongs to a polygon and includes a plurality of straight lines, the straight line and the arc are axially spaced in an interweaved manner. FIG. 18 only indicates partial linear zone 20a and circular zone 20b of the cam 20.

Speaking of the fitting section 101 on the central shaft 10, when installing the fitting section 101 on the cam 20, the circular zone 10b matches with the circular zone 20b of the inner bore of the cam 20. Specifically speaking, the shape of the circular zone 10b fits well with the circular zone 20b of the inner bore of the cam 20, making the circular zone 10b (FIG. 16) of the outer circumferential surface of the central shaft 10 fit well with the circular zone 20b (FIG. 18) of the inner bore of the cam 20.

In this embodiment, the outer circumferential surface profile of the central shaft in this camshaft includes linear zone and circular zone arranged in an interweaved manner, and the linear zone belongs to the same polygon, the circular zone belongs to the same circle. When fitting with the cam, a concentric assembly of the two can be realized by fitting the circular zone with the corresponding circular zone inside the cam, and a fixed and rotation resisting connection can be realized between these two through fitting between the circular zone and the cam inner bore. Compared with the prior camshafts using splined connection, this solution can transmit a higher torque and its structure is more simplified.

Wherein, the circle to which the circular zone 10b (or 20b) belongs and the polygon to which the linear zone 10a (or 20a) belongs are concentric, in other words, the geometrical centers of these two coincide.

Figure 17:
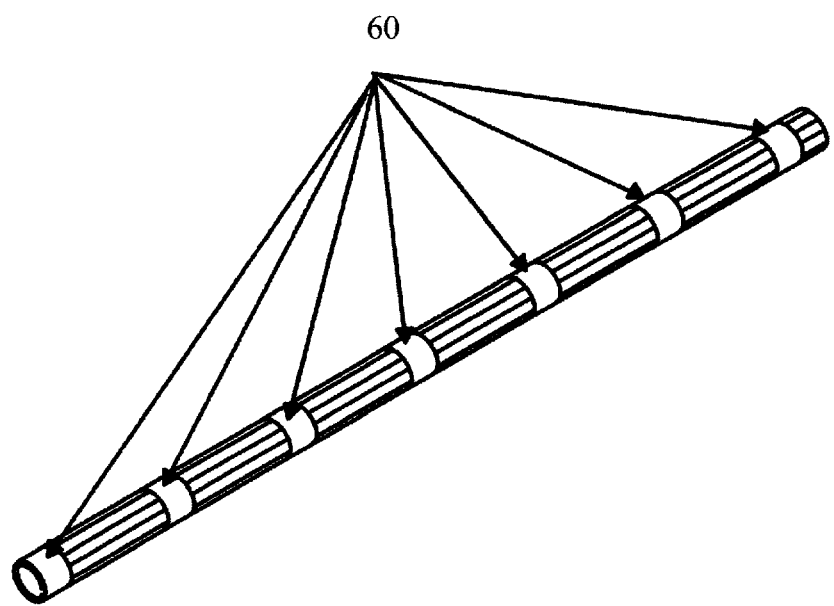
FIG. 17 is a 3-dimensional schematic view showing the central shaft of a camshaft provided in the embodiments of the present invention.

Further referring to FIG. 17, the camshaft also includes journal 60, the journal 60 is installed on outer circumferential surface of the central shaft 10, outer cylindrical surface is made on it at a certain interval to form journals 60, journal 60 is used for rotating and supporting the whole camshaft, the outer cylindrical surfaces are arc connected with the circular zone and linear zone of the central shaft.

Figure 19:
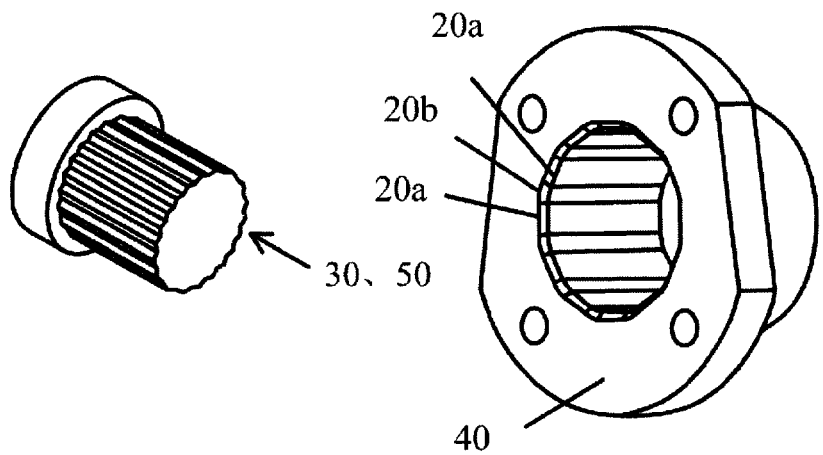
FIG. 19 is a schematic view showing the drive unit and its end caps of the camshaft provided in the embodiments of the present invention.

Referring to FIG. 15 and FIG. 19, the camshaft also includes a drive unit 40, the drive unit 40 is installed on one end of the central shaft, cross section profile and shape of the inner circumferential surface of the drive unit 40 is identical to the cross section profile and shape of the outer circumferential surface of the fitting section 101 on the central shaft 10.

Referring to FIG. 15 and FIG. 19, the camshaft also includes two end caps 30 and 50, diameter of the outer cylindrical surface at one end of the end caps 30 and 50 is slightly bigger than the inner bore of the central shaft, the outer cylindrical surfaces of the end caps are then subjected to knurling process; the end caps 30 and 50 are press installed in the inner bores at both ends of the central shaft.

Here, besides dodecagon, the aforesaid polygon can also be any other polygons. Number of sides of the polygon can be integral multiple of the number of engine cylinders, for instance, 1×, 2×, etc. For example, for a 3-cylinder or 6-cylinder engine, the aforesaid polygon may be a hexagon; for a 4-cylinder engine, the aforesaid polygon may be a quadrangle. Phase difference between the two cams corresponding with two neighboring engine cylinders is n*(360°/N), where N stands for the number of engine cylinders, n stands for 1 or an integer bigger than 1.

In some of the other embodiments, it is also possible to only configure the cross section profile of the inner circumferential surface of the cam into aforesaid shape that includes linear zone and circular zone, and no limit is given to the profile and shape of the outer circumferential surface of the central shaft, which can be cylindrical shape.

Embodiment 10

This embodiment provides a camshaft manufacturing method, and the method includes the following steps:

S'11: Forming the cam by using forging process;

S'12: Installing the cam and drive unit on the central shaft, pressing the two end caps into the two ends of the central shaft.

Figure 20:
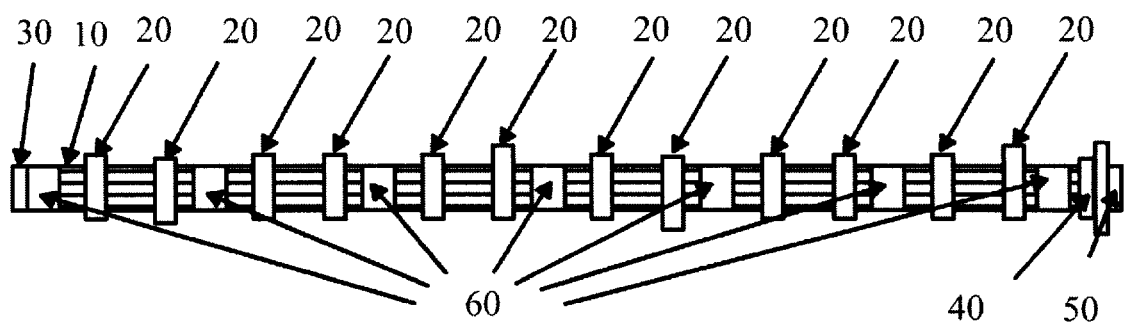
FIG. 20 is a structure schematic view showing manufacturing of the camshaft provided in the embodiments of the present invention.

Referring to FIG. 19 and FIG. 20, at least one of the cam 20 and drive unit 40 is installed on the central shaft 10 and fixed on the central shaft 10 axially, radially and circumferentially. In other words, the cam 20 and drive unit 40 are totally fixed with the central shaft 10, and after the assembly is completed, they cannot engage in any motion relative to the central shaft 10.

Furthermore, the manufacturing method of this embodiment also includes Step S'13.

Step S'13: Expanding the part of the central shaft 10 that is inserted in the cam 20 and drive unit 40, making the inserted part have its outer diameter increased and tightly press against the cam 20 and unit drive 40 radially.

Before expansion, outer diameter of the fitting section 101 may be slightly smaller than inner diameter of the cam 20 and drive unit 40, after inserting the fitting section 101 into the cam 20 and drive unit 40, very small radial clearance may exist between the outer circumferential surface of the fitting section 101 and the inner circumferential surface of the cam 20 and drive unit 40. After expansion, part of the fitting section 101 inserted into the cam 20 and drive unit 40 has its outer diameter increased, the radial clearance between the cam 20 and drive unit 40 and the inserted part 101 is eliminated, thus, resulting in a tight fit between the cam 20 and unit drive unit 40 and the inserted part of the fitting section 101, whereby the cam 20 and drive unit 40 are fixed on the central shaft 10 axially, radially and circumferentially.

Figure 21:
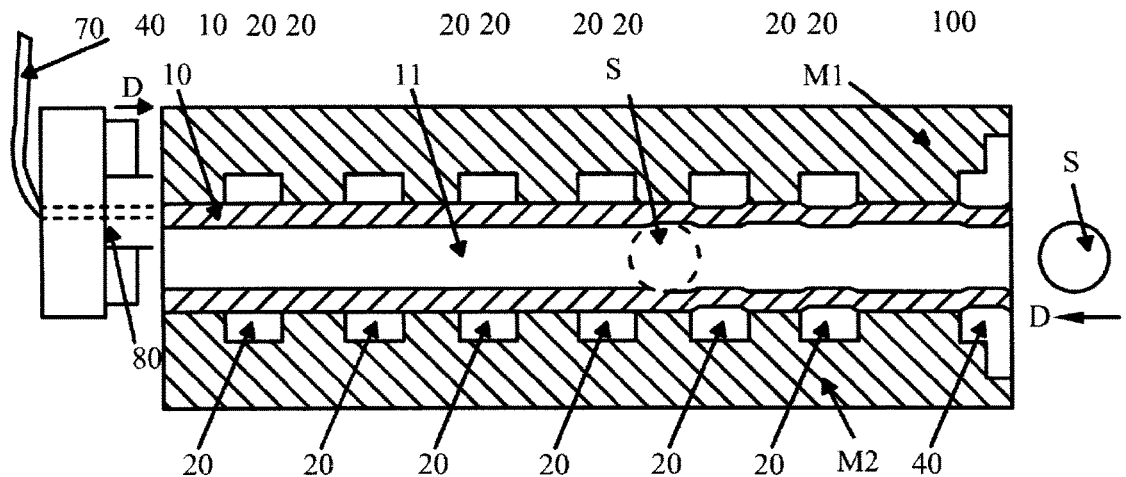
FIG. 21 is a cutaway structure schematic drawing showing a camshaft central shaft expansion provided in the embodiments of the present invention.

In this embodiment, referring to FIG. 21, the central shaft 10 has an axial hole 11. Here, the axial hole 11 may be through hole or blind hole, and its quantity may be one or two that are respectively opening towards the two axial ends of the central shaft. However, it should be noted that the axial hole 11 should extends to each of the locations that need expansion.

Speaking of Step 13, when expanding the part of the fitting section 101 inside the cam 20 and drive unit 40, the expansion procedure includes: installing the cam 20 and the drive unit 40 on the central shaft 10, and then carrying out axial positioning of the cam 20 and drive unit 40 by using the upper mould M1 and lower mould M2, carrying out angular positioning by using the polygon of the outer circumferential surface of the central shaft 10, and insert the expansion part S into the axial hole 11 of the central shaft 10, making the inserted part of the fitting section 101 expand axially.

Here, the expansion part S is a rigid part, then, radially towards at least one direction, dimensions of the expansion part S should be bigger than the dimensions of the axial hole 11. Otherwise, the expansion effect cannot be achieved.

In some embodiments, the expansion part S is a rigid spherical part, for example, a steel ball. Diameter of the steel bar is bigger than the diameter of the hole 11. After the cam 20 and drive unit 40 is put on the central shaft 10, the steel ball is inserted into the hole 11 from one axial end of the central shaft 10, then is pushed to move axially towards the other end in the hole 11. At the locations coming into contact with the steel ball, diameter of the central shaft 10 is expanded bigger. Thus, when the steel ball moves to the inserted part of the fitting section, the inserted part will be expanded.

Figure 22:
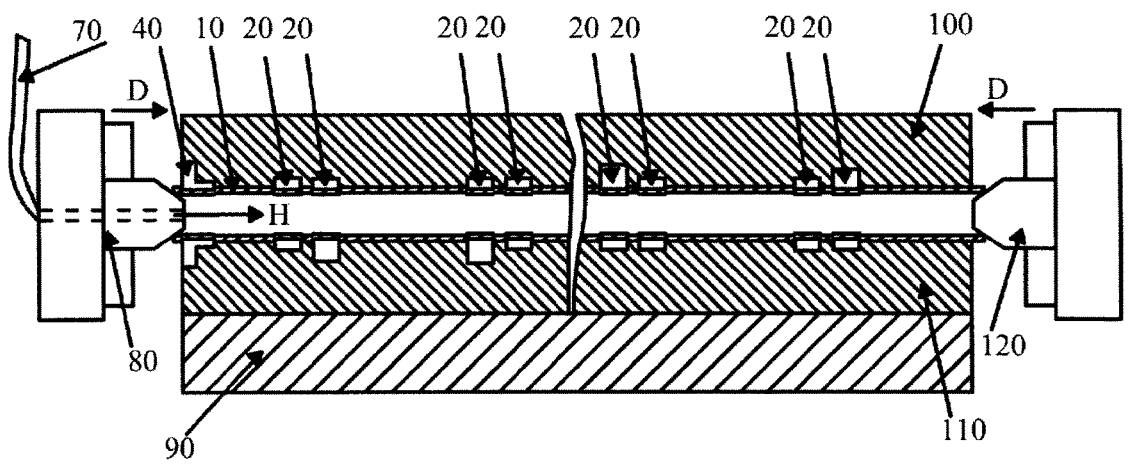
FIG. 22 is a cutaway structure schematic drawing showing another camshaft central shaft expansion provided in the embodiments of the present invention.

In some of the other embodiments, referring to FIG. 22, the cam 20 and drive unit 40 are installed on the central shaft 10, the upper mould 100 and lower mould 110 are placed on the work bench 90, the cam 20 and drive unit 40 is axially positioned by using the upper mould 100 and lower mould 110 while angular position is carried out by using the polygon of the outer circumferential surface of the central shaft 10, the expansion part shown may be a fluid, and when expanding the part of the fitting section inserted in the cam: the central shaft 10 is sealed at both ends by using piston end caps 80 and 120, as the high-pressure liquid is pressed into the pipe in pipeline 70, fluid is continuously introduced under pressure into the axial hole 11, and the piston end caps

80 and 120 continuously presses against the two ends of the central shaft 10 for sealing, and forms internal high pressure inside the central shaft tube, making the inserted part of the fitting section expand radially.

It should be noted that during expansion by using a fluid, the hole 11 should be blocked at both ends. If the hole 11 is a blind hole, the fluid may be directly introduced into it. If the hole 11 is a through hole, then one end of the hole 11 shall be blocked in the first place, and the fluid can be introduced into the hole 11 from the other end of the hole 11, whereby the hole 11 of the central shaft 10 is expanded by making use of the fluid pressure.

After radial expansion and connection of the cam 20, drive unit 40 and the fitting section of the central shaft 10, the end caps 30, 50 are then pressed into the two ends of the central shaft 10; end caps 30, 50 can be made by machining process in advance, knurls are then made on the outer cylindrical surface at one end of the end caps, and then the knurled outer cylindrical surfaces are totally pressed into the two ends of the central shaft 10, and end caps 30, 50 can be used as the positioning datum for subsequent grinding operation.

Embodiment 11

This embodiment provides a camshaft manufacturing method, the manufacturing method includes:

S'21: Forming a central shaft having an axial hole;

S'22: Installing the cam and drive unit on the central shaft.

In Step S'21, the central shaft is formed in the following sub-steps:

S'211: Forming a tube part having outer cylindrical surface by using cold drawing process;

S'212: forming a plurality of circumferentially spaced planes on the outer cylindrical surface by cold drawing, the planes extend radially along the tube, making the cross sectional profile of the outer circumferential surface of the tube include linear zone and circular zone, the circular zone belongs to the same circle and includes multiple arcs, the linear zone belongs to the same polygon and includes multiple straight lines, the straight line and the arc are spaced in an interweaved manner circumferentially.

Herein, cross section shape of the tubular part may refer to FIG. 16.

The manufacturing method of this embodiment uses cold drawing process to form the tubular part, and uses cold drawing process to form the planes on the outer cylindrical surface of the tubular part, whereby a high precision can be ensured for the circular zone and linear zone of the tubular part, and there is no longer any need for further machining, thus, reducing the manufacturing cost of the camshaft.

In this embodiment, the circle to which the aforesaid circular zone belongs to and the polygon to which the linear zone belongs to are concentric. Configuration of the number of polygon sides is identical to the configuration mentioned in Embodiment 9.

Furthermore, before "installing the cam and drive unit on the central shaft" in Step S'22, it also includes Step S'23: use forging process to form the cam, finish machine the edges of the inner circumferential surface of the cam as well as the inner circumferential surfaces of the two end faces, and use machining process to form the drive unit. Herein, there is no time sequence relation between Step S'23 and Step S'21.

In this embodiment, structure of the cam is identical to Embodiment 10, and a reference may be made to FIG. 20.

The cross sectional shape of the inner circumferential surfaces of the cam and drive unit is identical to the cross sectional shape of the outer circumferential surface of the central shaft, cross sectional shape of the inner circumferential surfaces of the cam and drive unit may refer to FIG. 18 and FIG. 5. When installing the cam and drive unit on the central shaft, the outer circumferential surface of the central shaft matches with the inner circumferential surfaces of the cam.

In other words, in Step S'23, cross section of the inner circumferential surfaces of the cam and drive unit formed includes linear zone and circular zone, the circular zone belongs to one circle and includes a plural of arcs, the linear zone belongs to one polygon and includes a plural of straight lines, the straight lines and the arcs are circumferentially spaced in an interweaved manner.

Herein, speaking of the cross section of the inner circumferential surfaces of the cam and drive unit, the circle to which the circular zone belongs and the polygon to which the linear zone belongs may be concentric.

After "installing the cam on the central shaft" in Step S'22, it also includes the procedure for expanding the part of the central shaft inserted in the cam and drive unit, the procedure is identical to Embodiment 10, thus, will not be repeated here.

In some of the other embodiments, in the camshaft manufacturing methods, Step S'21 may also be completed by using prior methods instead of the method used in Steps S'211~S'212 of this embodiment. Meanwhile, Step S'23 of this embodiment is used for manufacturing the cam.

In some of the other embodiments, Step S'211~Step' 212 can be used for manufacturing other tubular parts than the central shaft. Step S'24 can also be used for manufacturing other cams than camshafts.

Although the present invention has been disclosed as above, it is not limited to the above. Any ordinary technical person in this field may make various types of changes and modifications without departing from the spirit and scope of this invention, thus, protection scope of this invention shall be the scope defined by the claims.

The invention claimed is:

1. A camshaft, characterized in that, it comprises:
    a central shaft with a fitting section, wherein the outer circumferential surface of the fitting section has the same cross sectional profile at any axial position, the cross sectional profile includes: a linear zone and a circular zone, the circular zone belongs to the same circle and includes multiple arcs, the linear zone belongs to the same polygon and includes multiple straight lines, and the straight line and the arc are spaced in an interweaved manner circumferentially, and interconnected into the cross sectional profile;
    a cam installed on the fitting section of the central shaft;
    a bearing, mounted on the fitting section of the central shaft, wherein the bearing has an inner bore for fitting with the central shaft, the inner bore is round and the circle has a diameter identical to that of the circle to which the circular zone belongs.

2. A camshaft, characterized in that, it comprises:
    a central shaft with a fitting section, wherein the outer circumferential surface of the fitting section has the same cross sectional profile at any axial position, the cross sectional profile includes: a linear zone and a circular zone, the circular zone belongs to the same circle and includes multiple arcs, the linear zone belongs to the same polygon and includes multiple straight lines, and the straight line and the arc are spaced in an interweaved manner circumferentially, and interconnected into the cross sectional profile;

a cam installed on the fitting section of the central shaft, the camshaft also comprising a bearing, wherein the bearing has an inner bore, and the inner bore includes a cambered surface for fitting with the circular zone of the central shaft.

3. A camshaft manufacturing method, characterized in that, it comprises:
forming a central shaft having an axial hole;
installing a cam on the central shaft;
the central shaft forming step comprising:
forming a tubular part with an outer cylindrical surface by cold drawing;
forming a plurality of circumferentially spaced planes on the outer cylindrical surface by cold drawing, wherein the planes extend radially along the tube, making a cross sectional profile of the outer circumferential surface of the tube include linear zone and circular zone, the circular zone belongs to the same circle and includes multiple arcs, the linear zone belongs to the same polygon and includes multiple straight lines, and the straight line and the arc are spaced in an interweaved manner circumferentially, and interconnected into the cross sectional profile.

4. A camshaft, characterized in that, it comprises:
a central shaft with fitting sections, wherein a cross sectional profile of the outer circumferential surface of each fitting section is the same in the axial position, the cross sectional profile includes a linear zone and a circular zone, the circular zone belongs to the same circle and includes multiple arcs, the linear zone belongs to the same polygon and includes multiple straight lines, the straight lines and the arcs are spaced in an interweaved manner circumferentially, and interconnected into the cross sectional profile;
a cam and a drive unit installed on the fitting sections of the central shaft;
end caps, wherein the end caps are pressed into the center holes on both ends of the central shaft for sealing the ends of the central shaft.

5. The camshaft of claim 4, characterized in that the circle and the polygon are concentric.

6. The camshaft of claim 4, characterized in that, it also comprises:
a journal, wherein the journal has an outer cylindrical surface, the journal is used for rotating and supporting the whole camshaft, the outer cylindrical surface of the journal is made on the outer circumferential surface of the central shaft at a certain interval, the outer cylindrical surface is connected with the circular zone and linear zone of the central shaft.

7. The camshaft of claim 4, characterized in that, it also comprises:
a journal, wherein the journal has an inner bore, the inner bore is a circle and the circle has a diameter identical to that of the inner bore of the central shaft.

8. The camshaft of claim 4, characterized in that the drive unit has an inner bore to match with the central shaft, the inner bore is round and the circle has a diameter identical to the diameter of the circle to which the circular zone belongs.

9. The camshaft of claim 4, characterized in that the drive unit has an inner bore, the inner bore includes a cambered surface to match with the circular zone of the central shaft.

10. The camshaft of claim 4, characterized in that the outer cylindrical surface at one end of the end cap has a diameter slightly bigger than the inner hole of the central shaft, the outer cylindrical surface of the end cap is made by a knurling process.

11. The camshaft of claim 4, characterized in that a cross sectional profile of the inner circumferential surface of the cam is identical to the cross sectional profile of the fitting section in shape.

12. The camshaft of claim 4, characterized in that the cam has a plurality of fitting sections respectively installed on the central shaft, and the fitting sections are spaced axially.

13. A camshaft manufacturing method, characterized in that, it comprises:
manufacturing a cam using a forging process, finishing an inner circumferential surface of the cam and an inner circumferential surface edge of both end faces of the cam;
forming a transmission unit by a machining process;
finishing the inner circumferential surface of the transmission unit and the inner circumferential surface edges of the both end faces;
installing the cam and the transmission unit on the central shaft having an axial hole;
expanding portions of the central shaft that extend into the cam and transmission unit to increase the outer diameters of the portions to press against the cam in the radial direction.

14. The camshaft manufacturing method of claim 13, characterized in that expanding portions of the central shaft that extend into the cam and transmission unit central shaft comprises:
inserting an expansion part into the axial hole of the central shaft, making the expanded portion of the central shaft expand radially.

15. The camshaft manufacturing method of claim 13, characterized in that expanding portions of the central shaft that extend into the cam and transmission unit comprises:
introducing a fluid under pressure into the axial hole of the central shaft shaft, making the expanded portion of the central shaft expand radially.

16. The camshaft manufacturing method of claim 13, characterized in that the central shaft is formed by:
forming a tube with an outer cylindrical surface by cold drawing;
forming a plurality of circumferentially spaced planes on the outer cylindrical surface by cold drawing, wherein the planes extend radially along the tube, making a cross sectional profile of the outer circumferential surface of the tube including a linear zone and a circular zone, the circular zone belongs to the same circle and includes multiple arcs, the linear zone belongs to the same polygon and includes multiple straight lines, the straight lines and the arcs are spaced in an interweaved manner circumferentially, and interconnected into the cross sectional profile.

17. The camshaft manufacturing method of claim 16, characterized in that
before installing the cam on the central shaft, the outer cylindrical surface is made on the outer circumferential surface of the central shaft at a preset interval to form a journal, the journal is used for rotating and supporting the camshaft, wherein the outer cylindrical surface is connected with the circular zone and linear zone of the central shaft.

* * * * *